United States Patent
Kim et al.

(10) Patent No.: US 11,092,787 B2
(45) Date of Patent: Aug. 17, 2021

(54) OPTICAL LENS ASSEMBLY AND ELECTRONIC APPARATUS HAVING THE SAME

(71) Applicant: Samsung Electronics Co., Ltd., Gyeonggi-do (KR)

(72) Inventors: Dong-woo Kim, Gyeonggi-do (KR); Tae-kun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 15/839,026

(22) Filed: Dec. 12, 2017

(65) Prior Publication Data

US 2018/0172963 A1   Jun. 21, 2018

(30) Foreign Application Priority Data

Dec. 15, 2016   (KR) ........................ 10-2016-0171671

(51) Int. Cl.
| | | |
|---|---|---|
| *G02B 15/14* | (2006.01) | |
| *G02B 27/00* | (2006.01) | |
| *G02B 13/00* | (2006.01) | |
| *G02B 13/06* | (2006.01) | |
| *G02B 13/02* | (2006.01) | |
| *G02B 13/04* | (2006.01) | |
| *G02B 13/18* | (2006.01) | |

(52) U.S. Cl.
CPC ..... *G02B 15/1421* (2019.08); *G02B 13/0045* (2013.01); *G02B 13/02* (2013.01); *G02B 13/04* (2013.01); *G02B 13/06* (2013.01); *G02B 13/18* (2013.01); *G02B 15/142* (2019.08); *G02B 27/0025* (2013.01)

(58) Field of Classification Search
CPC .... G02B 13/0045; G02B 13/02; G02B 13/04; G02B 13/06; G02B 13/18; G02B 15/142; G02B 15/1421; G02B 15/1425; G02B 15/143; G02B 15/1431; G02B 27/0025
USPC .................................................. 359/686–691
See application file for complete search history.

(56) References Cited

U.S. PATENT DOCUMENTS

| | | | |
|---|---|---|---|
| 9,316,820 B1* | 4/2016 | Hudyma | ................ G02B 13/06 |
| 2008/0239504 A1* | 10/2008 | Tsutsumi | ............. G02B 15/173 |
| | | | 359/676 |
| 2008/0278826 A1 | 11/2008 | Wakamiya | |
| 2012/0044575 A1 | 2/2012 | Saori | |
| 2015/0054988 A1* | 2/2015 | Kimura | .................. G02B 13/04 |
| | | | 348/240.3 |

(Continued)

FOREIGN PATENT DOCUMENTS

| | | |
|---|---|---|
| JP | 2009-145839 A | 7/2009 |
| JP | 2014-95854 A | 5/2014 |

*Primary Examiner* — Travis S Fissel
(74) *Attorney, Agent, or Firm* — Cha & Reiter, LLC

(57) ABSTRACT

Provided are an optical lens assembly and an electronic apparatus including the optical lens assembly. The optical lens assembly includes a first lens group having positive refractive power, a stop, and a second lens group having positive refractive power that are arranged from an object side to an image side. The first lens group includes a first lens having negative refractive power and a meniscus shape convex toward the object side, a second lens having negative refractive power, and at least one other lens. The second lens group includes at least three lenses, and a lens of the second lens group closest to the image side has at least one inflection point.

18 Claims, 24 Drawing Sheets

(56) References Cited

U.S. PATENT DOCUMENTS

| | | | |
|---|---|---|---|
| 2015/0103413 A1* | 4/2015 | Uchida | G02B 13/18 |
| | | | 359/694 |
| 2015/0326792 A1* | 11/2015 | Yamasaki | H04N 5/2253 |
| | | | 348/240.3 |
| 2016/0202452 A1* | 7/2016 | Kuo | G02B 27/0025 |
| | | | 359/708 |

* cited by examiner

OPTICAL LENS ASSEMBLY AND ELECTRONIC APPARATUS HAVING THE SAME

CLAIM OF PRIORITY

This application claims the benefit of Korean Patent Application No. 10-2016-0171671, filed on Dec. 15, 2016, in the Korean Intellectual Property Office, the disclosure of which is incorporated herein in its entirety by reference.

BACKGROUND

1. Field

The present disclosure generally relates to an optical lens assembly and an electronic apparatus including the optical lens assembly, and more particularly, to an optical lens assembly having a super wide field of view and an electronic apparatus including the optical lens assembly.

2. Description of the Related Art

Electronic apparatuses that exist in the art provide various services and functions. For example, electronic apparatuses such as mobile devices or user devices may provide various services using various sensor modules, and may provide photographic services or video services. Along with the increasing use of electronic apparatuses, the use of cameras operatively connected to electronic apparatuses has also gradually increased. This increasing use has caused improvements in the performance and/or resolution of cameras of electronic apparatuses. Photographs of various landscapes or people, or selfies may be taken using these cameras of electronic apparatuses. In addition, the captured photographs or videos may be shared through social network sites or other media.

Advances in semiconductor and display technology have enabled the development of various lenses for cameras of mobile devices. These lenses include low-resolution lenses, high-resolution lenses, small-sensor-format lenses, large-sensor-format lenses (e.g., sensors ranging from ⅛" to ½"), telephoto lenses, and super-wide-angle lenses.

SUMMARY

Because space within portable devices are at a premium, photographing devices for these portable devices are required to be small in size. However, super-wide-angle lenses or fish-eye lenses do not have an optimized lens structure in front of their stops, and thus it is difficult to adjust the aberration of the lenses when the lenses are designed to have a super wide field of view, a large maximum aperture, also be small in size.

Recently, omnidirectional cameras, such as cameras capable of omnidirectional photographing for virtual reality (VR) have been actively developed. Two or more optical systems each having a field of view of a fish-eye lens are arranged in a single camera in different directions to implement omnidirectional photographing. However, in the implementation of VR, the captured images of the two or more optical systems are stitched together to from the omnidirectional image, and long-distance double image error and short-distance dead zone error caused by temperature-dependent focusing errors occur within the stitched region of the omnidirectional image, which may disturb the user experience in VR. Therefore, so as to address problems caused by stitching, there is a need for a small, super-wide-angle optical system with better temperature-dependent performance.

Various embodiments may provide super-wide-angle optical lens assemblies that may be used, for example, in electronic apparatuses (such as portable terminals).

In addition, various embodiments may provide electronic apparatuses including super-wide-angle optical lens assemblies.

In addition, various embodiments may provide electronic apparatuses each including a plurality of super-wide-angle optical lens assemblies for omnidirectional photographing.

Additional aspects will be set forth in part in the description which follows and, in part, will be apparent from the description, or may be learned by practice of the presented embodiments.

To solve the above-described problems or other problems, for example, an optical lens assembly according to an embodiment may include: a first lens group having positive or negative refractive power, a stop, and a second lens group having positive refractive power that are arranged from an object side to an image side, wherein the first lens group may include a first lens having a negative refractive power and a meniscus shape convex toward the object side, a second lens having a negative refractive power, and at least one other lens, wherein the second lens group may include at least three lenses, and a lens of the second lens group closest to the image side has an object-side surface convex toward the object side in a region near an optical axis and concave toward the object side in a peripheral region of the lens.

To solve the above-described problems or other problems, for example, an optical lens assembly according to another embodiment may include: a first lens group having positive or negative refractive power, a stop, and a second lens group having positive refractive power that are arranged from an object side to an image side, wherein the first lens group may include a first negative lens having a meniscus shape convex toward the object side, a second negative lens, and a third positive lens being a biconvex lens, wherein a lens of the second lens group closest to the object side may have at least one inflection point on at least one of its object-side surface and its image-side surface, and wherein the optical lens assembly may have a field of view within the range of about 130° or greater.

To solve the above-described problems or other problems, for example, an electronic apparatus according to an embodiment may include: at least one optical lens assembly and an image sensor configured to receive image-forming light from the at least one optical lens assembly, wherein the at least one optical lens assembly may include a first lens group having positive or negative refractive power, a stop, and a second lens group having positive refractive power that are arranged from an object side to an image side, wherein the first lens group may include a first lens having negative refractive power and a meniscus shape convex toward the object side, a second lens having negative refractive power, and at least one other lens, wherein the second lens group may include at least three lenses, and a lens of the second lens group closest to the image side may have an object-side surface convex toward the object side in a region near an optical axis and concave toward the object side in a peripheral region of the lens.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
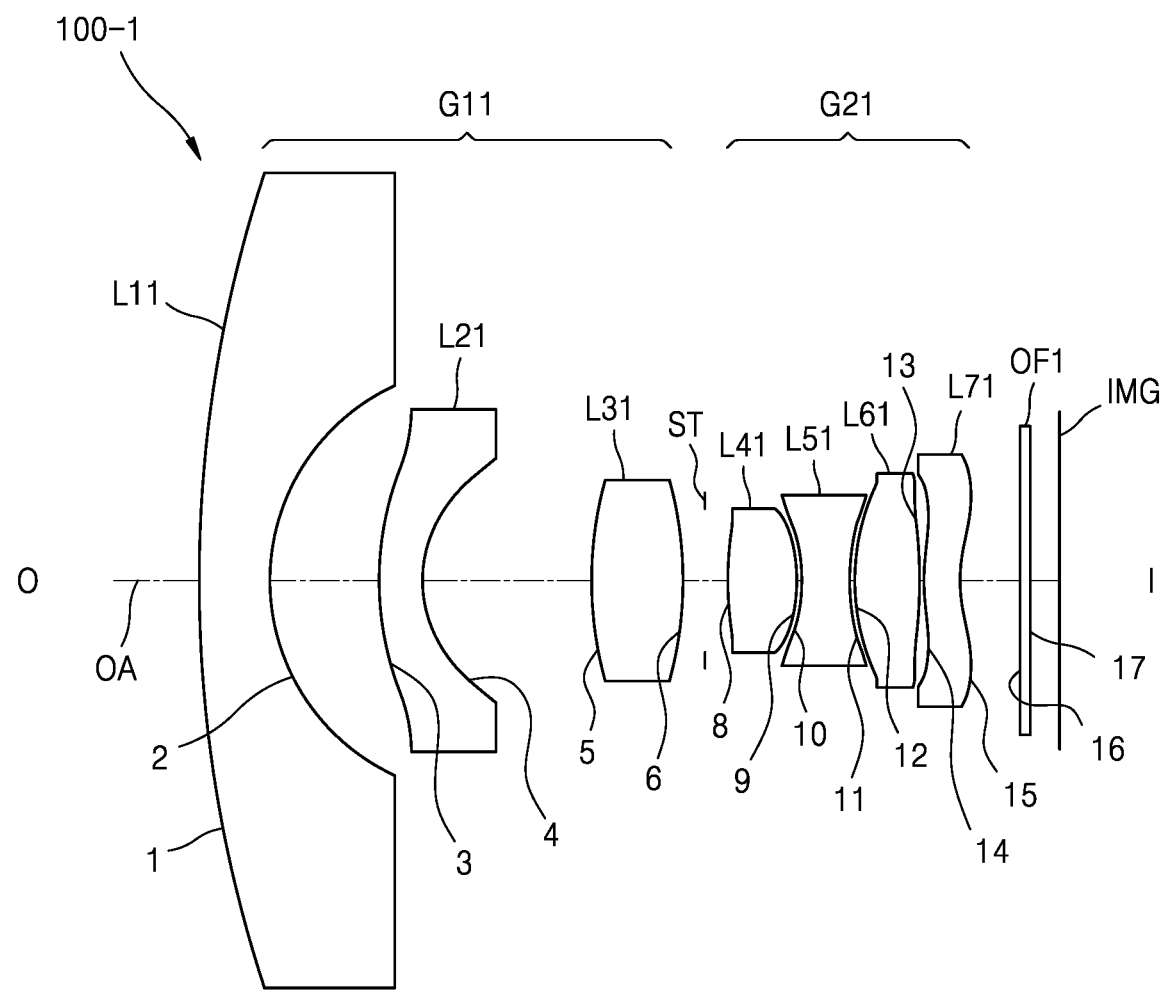
FIG. 1 illustrates an optical lens assembly of a first numerical embodiment according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments. In describing the drawings, similar reference numerals may be used to designate similar constituent elements.

As used herein, the expressions "have," "may have," "include," or "may include" refer to the existence of a corresponding feature (e.g., numeral, function, operation, or constituent element, such as component), and do not exclude one or more additional features.

In the present disclosure, the expressions "A or B," "at least one of A and/or B," and "one or more of A and/or B" may include all possible combinations of the items listed. For example, the expressions "A or B," "at least one of A and B," or "at least one of A or B" refer to all of (1) including at least A, (2) including at least B, and (3) including all of at least A and at least B.

Expressions, such as "a first," "a second," "the first," or "the second," used herein may indicate various elements regardless of the order and/or the importance of the elements. Such expressions are used to distinguish one element from other elements, but do not limit the corresponding elements. For example, a first user device and a second user device may indicate different user devices regardless of the order or importance of the user devices. For example, a first element may be referred to as a second element, and similarly, a second element may be referred to as a first element without departing from the scope of the present disclosure.

It should be understood that when an element (e.g., first element) is referred to as being (operatively or communicatively) "coupled," or "connected," to another element (e.g., second element), the first element may be coupled or connected directly to the second element or any other element (e.g., third element) may be interposed between the two elements. In contrast, it may be understood that when an element (e.g., first element) is referred to as being "directly coupled," or "directly connected" to another element (second element), there are no element (e.g., third element) interposed between the two elements.

The expression "configured to" used herein may be exchanged with, for example, "suitable for," "having the capacity to," "designed to," "adapted to," "made to," or "capable of" according to the situation. The expression "configured to" does not necessarily imply "specifically designed to" in hardware. Alternatively, in some situations, the expression "device configured to" may mean that the device, together with other devices or components, "is able to." For example, the phrase "processor configured (or adapted) to perform A, B, and C" may refer to a dedicated processor (e.g. an embedded processor) only for performing the corresponding operations or a generic-purpose processor (e.g., a central processing unit (CPU) or application processor (AP)) that can perform the corresponding operations by executing one or more software programs stored in a memory device.

Terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the same meanings as the contextual meanings in the relevant field of art, and are not to be interpreted to have ideal or excessively formal meanings unless clearly defined herein. In some cases, even a term defined in the present disclosure should not be interpreted as a meaning of excluding some embodiments.

An electronic apparatus, according to various embodiments, may include at least one of a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, or a wearable device. According to various embodiments, the wearable device may include at least one of an accessory type (e.g., a watch, a ring, a bracelet, an anklet, a necklace, glasses, a contact lens, or a head-mounted device (HMD)), a fabric or clothing integrated type (e.g., electronic clothing), a body-mounted type (e.g., a skin pad, or tattoo), or a bio-implantable type (e.g., an implantable circuit).

According to some embodiments, the electronic apparatus may be a home appliance. The home appliance may include at least one of, for example, a television, a digital versatile disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, or an electronic photo frame.

According to another embodiment, the electronic apparatus may include at least one of various medical devices such as portable medical measuring devices (e.g., a blood glucose monitoring device, a heart rate monitoring device, a blood pressure measuring device, or a body temperature measuring device, a magnetic resonance angiography (MRA) machine, a magnetic resonance imaging (MRI) machine, a computed tomography (CT) machine, or an ultrasonic machine), a navigation device, a global navigation satellite system (GNSS), an event data recorder (EDR), a flight data recorder (FDR), a vehicle infotainment device, an electronic apparatus for a ship (e.g., a navigation device for a ship, and a gyro-compass), an avionics device, a security device, an automotive head unit, a robot for home or industry, an automatic teller's machine (ATM), a point of sales (POS) machine, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

According to some embodiments, the electronic apparatus may include at least one of a part of furniture or a building/structure, an electronic board, an electronic signature receiving device, a projector, or various kinds of measuring instruments (e.g., a water meter, an electric meter, a gas meter, or a radio wave meter). The electronic apparatus, according to various embodiments, may be a combination of one or more of the aforementioned various devices. In some embodiments, the electronic apparatus may be a flexible device. Furthermore, the electronic apparatus is not limited to the aforementioned devices, and may include a new electronic apparatus according to the development of new techniques.

Hereinafter, electronic apparatuses will be described according to various embodiments with reference to the accompanying drawings. As used herein, the term "user" may indicate a person who uses an electronic apparatus or a device (e.g., an artificial intelligence electronic apparatus) that uses an electronic apparatus.

Hereinafter, optical lens assemblies and apparatuses including the optical lens assemblies will be described according to various embodiments with reference to the accompanying drawings.

FIG. 1 illustrates an optical lens assembly 100-1 of a first numerical embodiment according to various embodiments.

According to various embodiments, the optical lens assembly 100-1 may include a first lens group G11 and a second lens group G21 arranged from an object side O toward an image side I. A stop ST may be between the first lens group G11 and the second lens group G21.

For example, the first lens group G11 may have positive refractive power. The second lens group G21 may have positive refractive power.

In the following descriptions of lenses, the term "image side I" may refer to the side of an image plane IMG. For example, the image plane IMG may be the surface of an imaging device or an image sensor on which images are detected by the image sensor, and the term "object side O" may refer to the side of the object whose images is to be captured. In addition, an "object-side surface" of a lens may refer to the surface of the lens facing the object along an optical axis OA and may be the left surface of the lens in the drawings, and an "image-side surface" of a lens may refer to the surface of the lens facing the image plane IMG along the optical axis OA and may be the right surface of the lens in the drawings. For example, the image sensor may include a complementary metal oxide semiconductor (CMOS) image sensor or a sensor such as a charge coupled device (CCD). However, the image sensor is not limited thereto. For example, the image sensor may be a device capable of converting images of objects into electrical image signals.

The stop ST is for adjusting the diameter of the light beam incident on the image plane IMG. Examples of the stop ST may include aperture stops, variable stops, and mask type stops.

According to various embodiments, the first lens group G11 may include at least three lenses—a first lens L11, a second lens L21, and a third lens L31 that are arranged from the object side O toward the image side I. For example, the first lens L11 may have negative refractive power. For example, the first lens L11 may have a convex object-side surface 1. For example, the first lens L11 may have a meniscus shape convex toward the object side O. For example, the second lens L21 may have negative refractive power. For example, the second lens L21 may have a convex object-side surface 3. For example, the second lens L21 may have a meniscus shape convex toward the object side O. The third lens L31 may have positive refractive power. For example, the third lens L31 may have a convex image-side surface 6. For example, the third lens L31 may be a biconvex lens.

At least one of the first lens L11, the second lens L21, and the third lens L31 may be a bi-aspheric lens. For example, the second lens L21 may be a bi-aspheric lens. The lenses of the first lens group G11 may include glass or a plastic material. According to various embodiments, each of the first lens L11, the second lens L21, and the third lens L31 may be a glass lens. Alternatively, the first lens L11 and the second lens L21 may be glass lenses, and the third lens L31 may be a plastic lens.

Since two negative lenses are sequentially arranged in the first lens group G11 from the object side O, a field of view equal to or greater than about 130° may easily be obtained, and the optical lens assembly may be small in size. The second lens L21 may be an aspheric meniscus lens, and in this case, peripheral astigmatic aberration of an optical system having a field of view within the range of about 130° or greater may easily be corrected. The third lens L31 closest to the image side I in the first lens group G11 may be a biconvex lens having a refractive index of about 1.73 to about 1.85, and in this case, focusing errors occurring at high temperatures may be compensated for. Alternatively, the third lens L31 closest to the image side I in the first lens group G11 may be a biconvex lens having a refractive index of about 1.8 or greater, and in this case, the next second lens group G21 may have be small in size. In addition, when the third lens L31 is a biconvex lens, spherical aberration may easily be corrected.

The stop ST is between the first lens group G11 and the second lens group G21 such that the sizes of the first and second lens groups G11 and G21 may be reduced.

The second lens group G21 may include at least three lenses. Sequentially from the object side O, these lenses may be a fourth lens L41 having positive refractive power, a fifth lens L51 having negative refractive power, and a sixth lens L61 having positive refractive power. The fourth lens L41 may be a biconvex lens. The fifth lens L51 may be a biconcave lens. The sixth lens L61 may be a biconvex lens.

The fourth lens L41 and the fifth lens L51 may be made of materials having an Abbe number difference of about 30 or greater so as to effectively correct axial chromatic aberration and lateral chromatic aberration occurring at peripheral regions of the optical lens assembly. The fourth lens L41 may be a biconvex aspheric lens. When the fourth lens L41 closest to the object side O in the second lens group G21 is a biconvex aspheric lens, spherical aberration may be effectively corrected.

The fifth lens L51 which is second closest to the object side O in the second lens group G21 may be a biconcave aspheric lens, and in this case, tangential astigmatic aberration may be effectively corrected.

The sixth lens L61 may be a bi-aspheric lens. The sixth lens L61 of the second lens group G21 may be a biconvex aspheric lens having an F number of about 2.0 or greater, and in this case, the increase in peripheral astigmatic aberration may be effectively reduced. A seventh lens L71 may be further included in the second lens group G21 so that it is closest to the image side I. The object-side surface 14 and/or the image-side surface 15 of the seventh lens L71 may have at least one inflection point. The term "inflection point" may refer to a point at which the sign of the radius of curvature of the lens surface changes from positive (+) to negative (−), or from negative (−) to positive (+). In other words, the term "reflection point" may refer to a point at which the shape of a lens surface changes from convex to concave, or from concave to convex. The term "radius of curvature" may refer to a value expressing the degree of curvature at each point of a curve or a curved surface. The object-side surface 14 of the seventh lens L71 may be convex toward the object side O in the center region of the lens and concave toward the object side O in the peripheral region of the lens. The image-side surface 15 of the seventh lens L71 may be concave toward the image side I in the center region of the lens and convex toward the image side I in the peripheral region of the lens. The seventh lens L71 may be an aspheric plastic lens. Owing to this configuration of the seventh lens L71, the angle of incidence of light in the peripheral region of the image plane IMG may be adjusted depending on the type of the image sensor, and thus a small optical system may be provided.

According to various embodiments, all the lenses of the second lens group G21 may be aspheric plastic lenses. In this case, a small, high-performance, inexpensive optical system may be provided. When all of the four lenses of the second lens group G21 are aspheric plastic lenses, and the focal length of the second lens group G21 is prevented from decreasing due to temperature variations, and the focal point and aberration of the second lens group G21 may also minimally vary with temperature variations.

According to various embodiments, at least one optical element OF1 may be between the seventh lens L71 and the image plane IMG. The optical element OF1 may include at least one of a low pass filter, an infrared (IR)-cut filter, or cover glass. For example, if the optical element OF1 includes an IR-cut filter, visible light rays may pass through the optical element OF1 but infrared rays may not pass through the optical element OF1. Thus, infrared rays may not reach the image plane IMG. However, in an alternative embodiment, the optical lens assembly may not include the optical element OF1.

Figure 3:
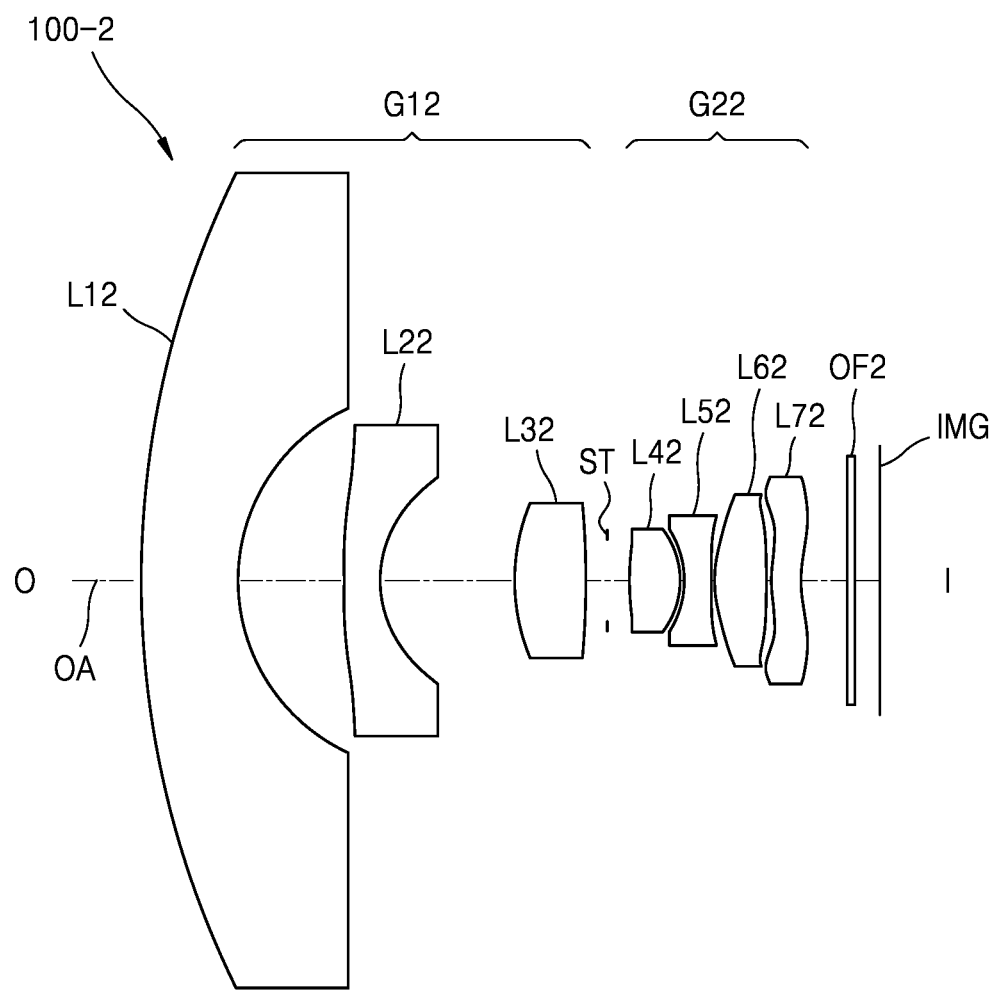
FIG. 3 illustrates an optical lens assembly of a second numerical embodiment according to various embodiments.

FIG. 3 illustrates an optical lens assembly 100-2 of a second numerical embodiment according to various embodiments.

According to various embodiments, the optical lens assembly 100-2 may include a first lens group G12 and a second lens group G22 arranged from the object side O toward the image side I. A stop ST may be between the first lens group G12 and the second lens group G22. For example, the first lens group G12 may have positive refractive power. For example, the second lens group G22 may have positive refractive power.

According to various embodiments, the first lens group G12 may include a first lens L12, a second lens L22, and a third lens L32 that are arranged from the object side O toward the image side I. For example, the first lens L12 may have negative refractive power. For example, the first lens L12 may have a convex object-side surface. For example, the first lens L12 may have a meniscus shape convex toward the object side O. For example, the second lens L22 may have negative refractive power. For example, the second lens L22 may have a convex object-side surface. For example, the second lens L22 may have a meniscus shape convex toward the object side O. The third lens L32 may have positive refractive power. For example, the third lens L32 may have a convex image-side surface. For example, the third lens L32 may be a biconvex lens.

At least one of the first lens L12, the second lens L22, and the third lens L32 may be an aspheric lens. For example, the second lens L22 may be a bi-aspheric lens.

The second lens group G22 may include at least three lenses. Sequentially from the object side O, these lenses may include a fourth lens L42 having positive refractive power, a fifth lens L52 having negative refractive power, a sixth lens L62 having positive refractive power, and a seventh lens L72. The fourth lens L42 may be a biconvex lens. The fifth lens L52 may be a biconcave lens. The sixth lens L62 may be a meniscus lens convex toward the object side O. The seventh lens L72 may have positive or negative refractive power. The seventh lens L72 may have a meniscus shape convex toward the object side O in the region near an optical axis OA. The region near the optical axis OA may be a region defined by a predetermined radius from the optical axis OA. The seventh lens L72 may have at least one inflection point on its object-side surface and at least one inflection point on its image-side surface. According to various embodiments, at least one optical element OF2 may be between the seventh lens L72 and an image plane IMG.

Figure 5:
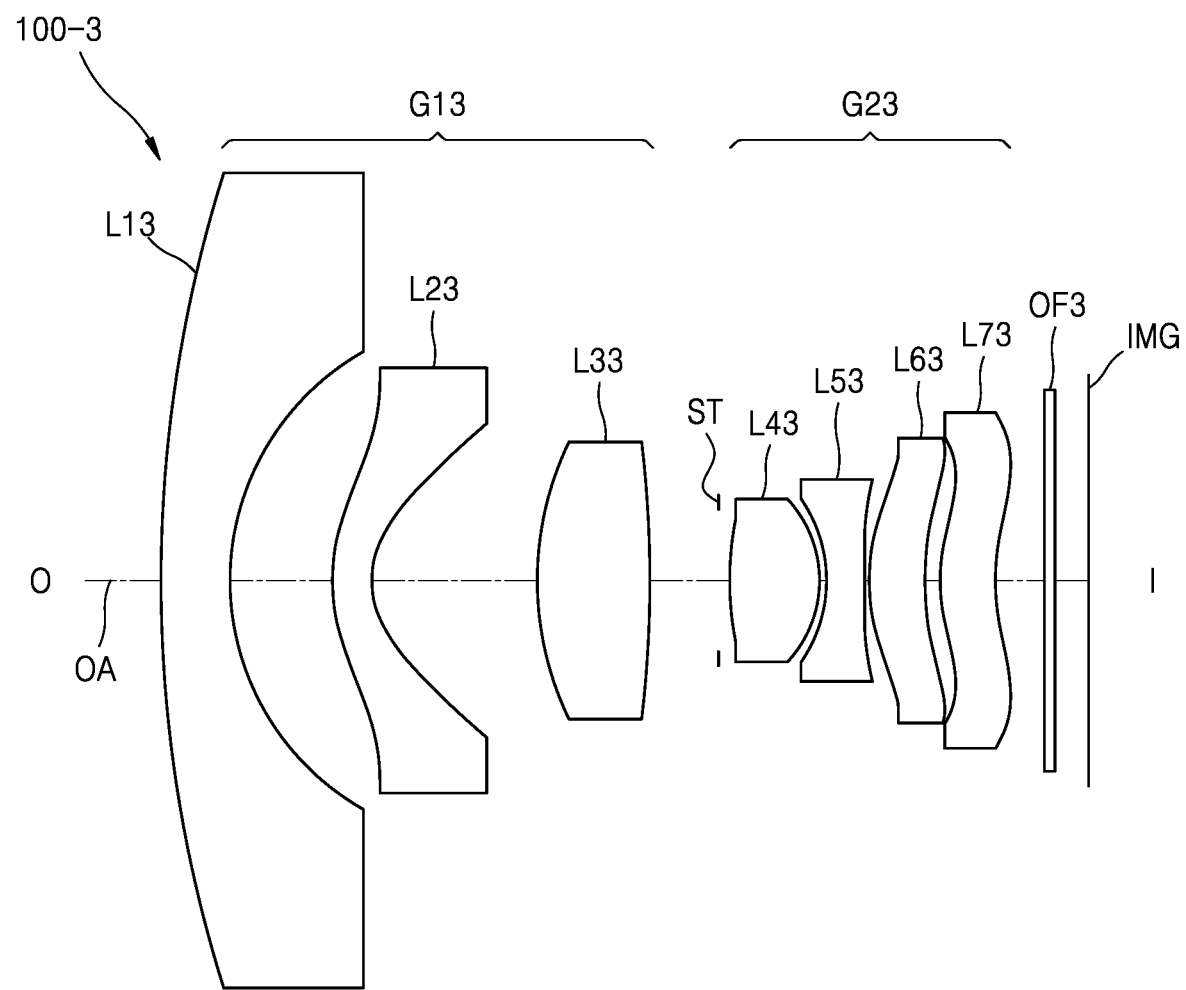
FIG. 5 illustrates an optical lens assembly of a third numerical embodiment according to various embodiments.

FIG. 5 illustrates an optical lens assembly 100-3 of a third numerical embodiment according to various embodiments According to various embodiments, the optical lens assembly 100-3 may include a first lens group G13 and a second lens group G23 arranged from the object side O toward the image side I. A stop ST may be between the first lens group G13 and the second lens group G23. For example, the first lens group G13 may have positive refractive power. For example, the second lens group G23 may have positive refractive power.

According to various embodiments, the first lens group G13 may include a first lens L13, a second lens L23, and a third lens L33 that are arranged from the object side O toward the image side I. Each of the first lens L13 and the second lens L23 may have negative refractive power and meniscus shapes convex toward the object side O. For example, the third lens L33 may be a biconvex lens.

The second lens group G23 may include at least three lenses. Sequentially from the object side O, these lenses may include a fourth lens L43 having positive refractive power, a fifth lens L53 having negative refractive power, a sixth lens L63 having positive refractive power, and a seventh lens L73. The fourth lens L43 may be a biconvex lens. The fifth lens L53 may be a meniscus lens concave toward the object side O. The sixth lens L63 may be a meniscus lens convex toward the object side O. The seventh lens L73 may have positive or negative refractive power. The seventh lens L73 may have a meniscus shape convex toward the object side O in the region near an optical axis OA. The region near the optical axis OA may be a region located within a predetermined radius from the optical axis OA. The seventh lens L73 may have at least one inflection point on its object-side surface and at least one inflection point on its image-side surface. According to various embodiments, at least one optical element OF3 may be between the seventh lens L73 and an image plane IMG.

Figure 7:
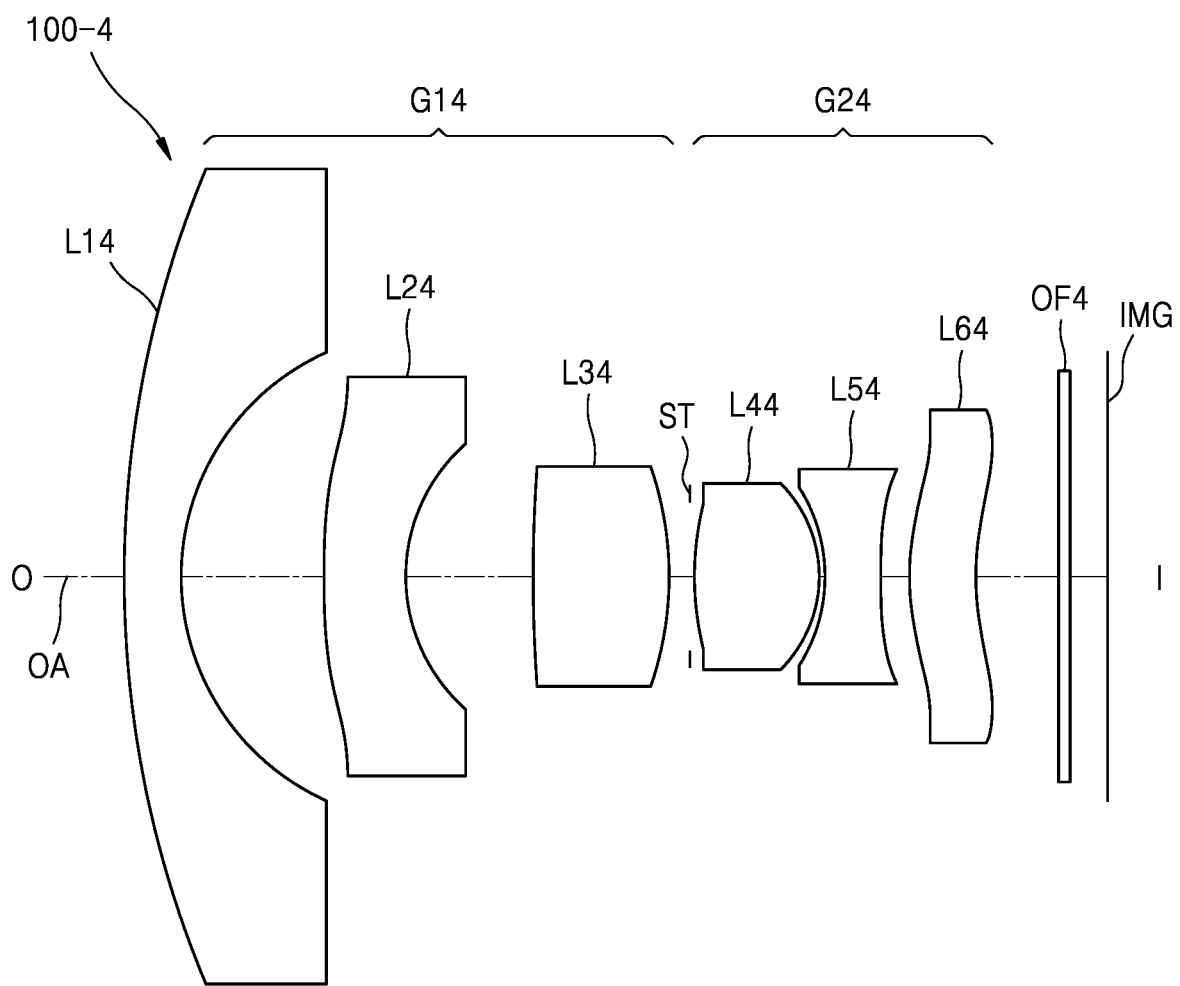
FIG. 7 illustrates an optical lens assembly of a fourth numerical embodiment according to various embodiments.

FIG. 7 illustrates an optical lens assembly 100-4 of a fourth numerical embodiment according to various embodiments.

According to various embodiments, the optical lens assembly 100-4 may include a first lens group G14 having positive refractive power, a stop ST, and a second lens group G24 having positive refractive power that are arranged from the object side O toward the image side I.

According to various embodiments, the first lens group G14 may include a first lens L14, a second lens L24, and a third lens L34 that are arranged from the object side O toward the image side I. Each of the first lens L14 and the second lens L24 may have negative refractive power and meniscus shapes convex toward the object side O. For example, the third lens L34 may be a biconvex lens.

The second lens group G24 may include at least three lenses. Sequentially from the object side O, these lenses may include a fourth lens L44 having positive refractive power, a fifth lens L54 having negative refractive power, and a sixth lens L64 having positive or negative refractive power. The fourth lens L44 may be a biconvex lens. The fifth lens L54 may be a biconcave lens. The sixth lens L64 may have at least one inflection point on its object-side surface and/or its image-side surface. The sixth lens L64 may have a meniscus shape convex toward the object side O in the region near an optical axis OA. According to various embodiments, at least one optical element OF4 may be between the sixth lens L64 and an image plane IMG.

Figure 9:
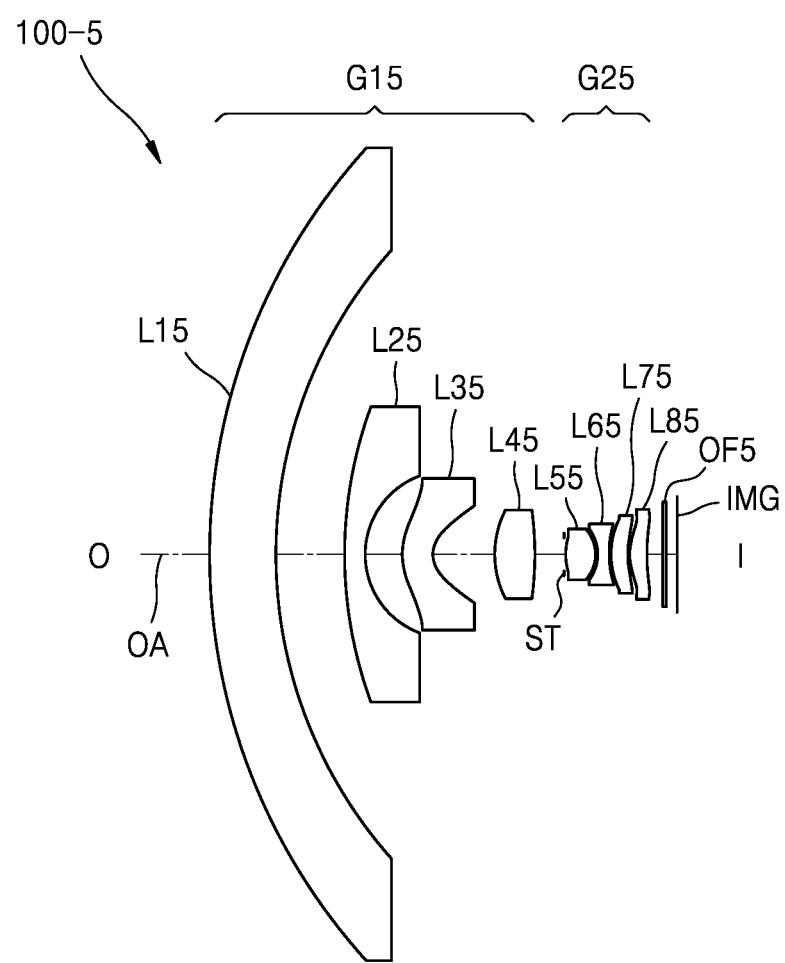
FIG. 9 illustrates an optical lens assembly of a fifth numerical embodiment according to various embodiments.

FIG. 9 illustrates an optical lens assembly 100-5 of a seventh numerical embodiment according to various embodiments.

According to various embodiments, the optical lens assembly 100-5 may include a first lens group G15 having positive refractive power, a stop ST, and a second lens group G25 having positive refractive power that are arranged from the object side O toward the image side I.

According to various embodiments, the first lens group G15 may include a first lens L15, a second lens L25, a third lens L35, and a fourth lens L45 that are arranged from the object side O toward the image side I. The first lens L15 may have a meniscus shape convex toward the object side O. The first lens L15 may be a cover glass lens for protecting the optical lens assembly 100-5 from the external environment. Each of the second lens L25 and the third lens L35 may have negative refractive power and meniscus shapes convex toward the object side O. For example, the fourth lens L45 may be a biconvex lens.

The second lens group G25 may include at least three lenses. Sequentially from the object side O, these lenses may include a fifth lens L55 having positive refractive power, a sixth lens L65, a seventh lens L75 having positive or negative refractive power, and an eighth lens L85. The fifth lens L55 may be a biconvex lens. The sixth lens L65 may be a biconcave lens. The seventh lens L75 may be a meniscus lens convex toward the object side O. The eighth lens L85 may have at least one inflection point on its object-side surface and/or its image-side surface. The eighth lens L85 may have a meniscus shape convex toward the object side O in the region near an optical axis OA. According to various embodiments, at least one optical element OF5 may be between the eighth lens L85 and an image plane IMG.

Figure 11:
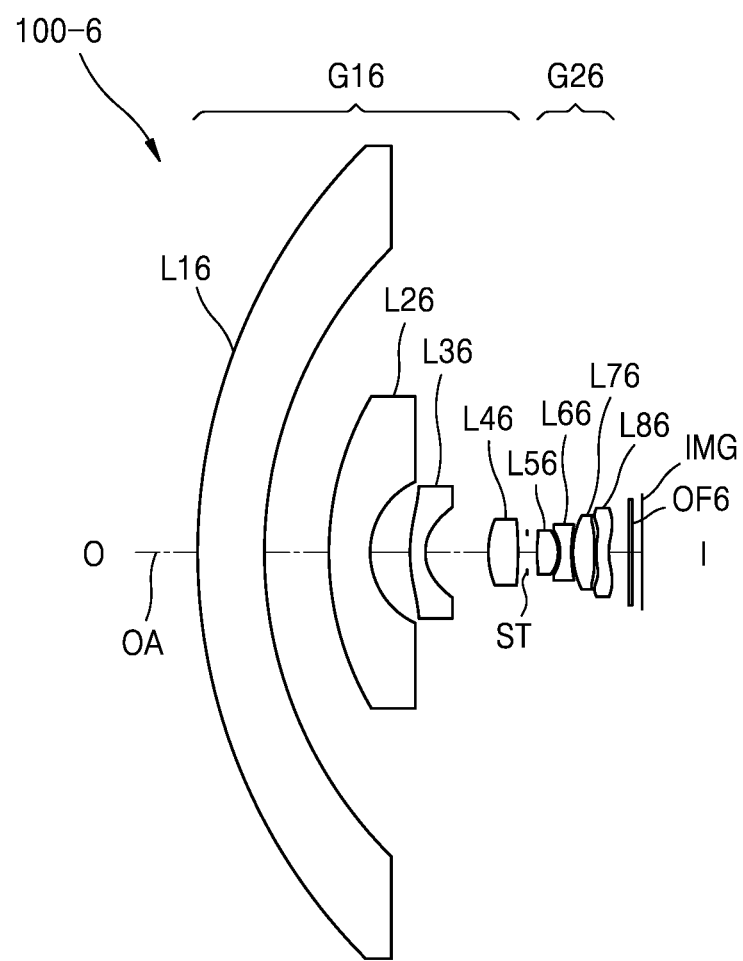
FIG. 11 illustrates an optical lens assembly of a sixth numerical embodiment according to various embodiments.

FIG. 11 illustrates an optical lens assembly 100-6 of a sixth embodiment according to various embodiments.

According to various embodiments, the optical lens assembly 100-6 may include a first lens group G16 having positive refractive power, a stop ST, and a second lens group G26 having positive refractive power that are arranged from the object side O toward the image side I.

According to various embodiments, the first lens group G16 may include a first lens L16, a second lens L26, a third lens L36, and a fourth lens L46 that are arranged from the object side O toward the image side I. The first lens L16 may have a meniscus shape convex toward the object side O. The first lens L16 may be a cover glass lens. Each of the second lens L26 and the third lens L36 may have negative refractive power and meniscus shapes convex toward the object side O. For example, the fourth lens L46 may be a biconvex lens.

The second lens group G26 may include at least three lenses. Sequentially from the object side O, these lenses may include a fifth lens L56 having positive refractive power, a sixth lens L66 having negative refractive power, a seventh lens L76 having positive refractive power, and an eighth lens L86 having positive or negative refractive power. The fifth lens L56 may be a biconvex lens. The sixth lens L66 may be a biconcave lens. The seventh lens L76 may be a meniscus lens convex toward the object side O. The eighth lens L86 may have at least one inflection point on its object-side surface and/or its image-side surface. The eighth lens L86 may have a meniscus shape convex toward the object side O in the region near an optical axis OA. According to various embodiments, at least one optical element OF6 may be between the eighth lens L86 and an image plane IMG.

Figure 13:
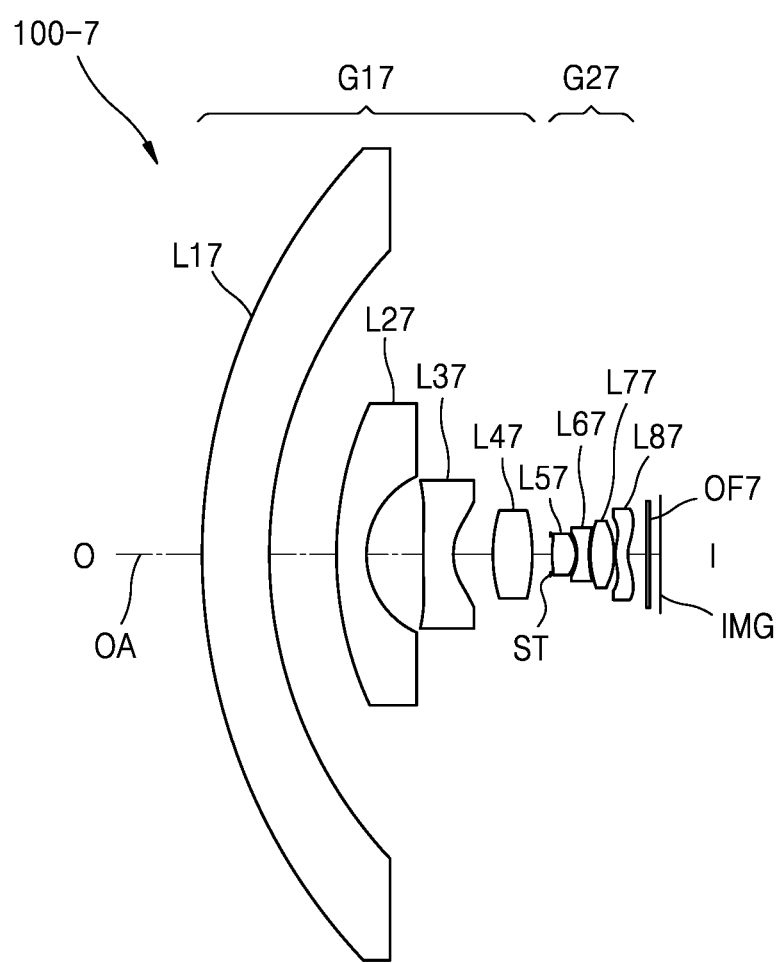
FIG. 13 illustrates an optical lens assembly of a seventh numerical embodiment according to various embodiments.

FIG. 13 illustrates an optical lens assembly 100-7 of a seventh numerical embodiment according to various embodiments.

According to various embodiments, the optical lens assembly 100-7 may include a first lens group G17 having positive refractive power, a stop ST, and a second lens group G27 having positive refractive power that are arranged from the object side O toward the image side I.

According to various embodiments, the first lens group G17 may include a first lens L17, a second lens L27, a third lens L37, and a fourth lens L47 that are arranged from the object side O toward the image side I. The first lens L17 may have a meniscus shape convex toward the object side O. The first lens L17 may be a cover glass lens. The second lens L27 may have negative refractive power and a meniscus shape convex toward the object side O. The third lens L37 may be a biconcave lens having negative refractive power. For example, the fourth lens L47 may be a biconvex lens.

The second lens group G27 may include at least three lenses. Sequentially from the object side O, these lenses may include a fifth lens L57 having positive refractive power, a sixth lens L67 having negative refractive power, a seventh lens L77 having positive refractive power, and an eighth lens L87 having positive or negative refractive power. The fifth lens L57 may be a biconvex lens. The sixth lens L67 may be a biconcave lens. The seventh lens L77 may be a biconvex lens. The eighth lens L87 may have at least one inflection point on its object-side surface and/or its image-side surface. The eighth lens L87 may have a meniscus shape convex toward the object side O in the region near an optical axis OA. According to various embodiments, at least one optical element OF7 may be between the eighth lens L87 and an image plane IMG.

Figure 15:
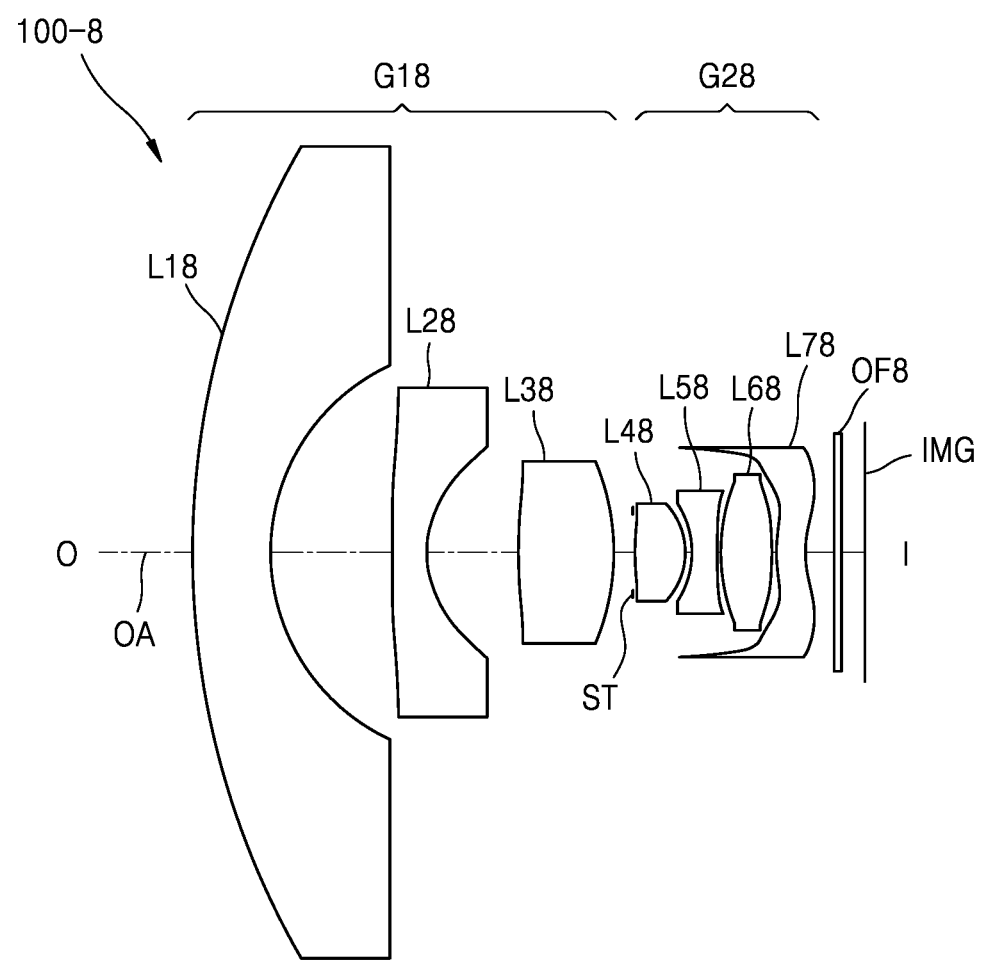
FIG. 15 illustrates an optical lens assembly of an eighth numerical embodiment according to various embodiments.

FIG. 15 illustrates an optical lens assembly 100-8 of an eighth numerical embodiment according to various embodiments.

According to various embodiments, the optical lens assembly 100-8 may include a first lens group G18 and a second lens group G28 arranged from the object side O toward the image side I. A stop ST may be between the first lens group G18 and the second lens group G28. For example, the first lens group G18 may have positive refractive power. For example, the second lens group G28 may have positive refractive power.

According to various embodiments, the first lens group G18 may include a first lens L18, a second lens L28, and a third lens L38 that are arranged from the object side O toward the image side I. For example, the first lens L18 may have negative refractive power. For example, the first lens L18 may have a meniscus shape convex toward the object side O. For example, the second lens L28 may have negative refractive power. For example, the second lens L28 may have a meniscus shape convex toward the object side O. The third lens L38 may have positive refractive power. For example, the third lens L38 may be a biconvex lens.

At least one of the first lens L18, the second lens L28, and the third lens L38 may be an aspheric lens. For example, the second lens L28 and the third lens L38 may be aspheric lenses.

The second lens group G28 may include at least three lenses. Sequentially from the object side O, these lenses may include a fourth lens L48 having positive refractive power, a fifth lens L58 having negative refractive power, a sixth lens L68 having positive refractive power, and a seventh lens L78. The fourth lens L48 may be a biconvex lens. The fifth lens L58 may be a biconcave lens. The sixth lens L68 may be a biconvex lens. The seventh lens L78 may have positive or negative refractive power. The seventh lens L78 may have a meniscus shape convex toward the object side O in the region near an optical axis OA. The seventh lens L78 may have at least one inflection point on its object-side surface and at least one inflection point on its image-side surface. According to various embodiments, all the lenses of the second lens group G28 may be bi-aspheric lenses. According to various embodiments, at least one optical element OF8 may be between the seventh lens L78 and an image plane IMG.

Figure 17:
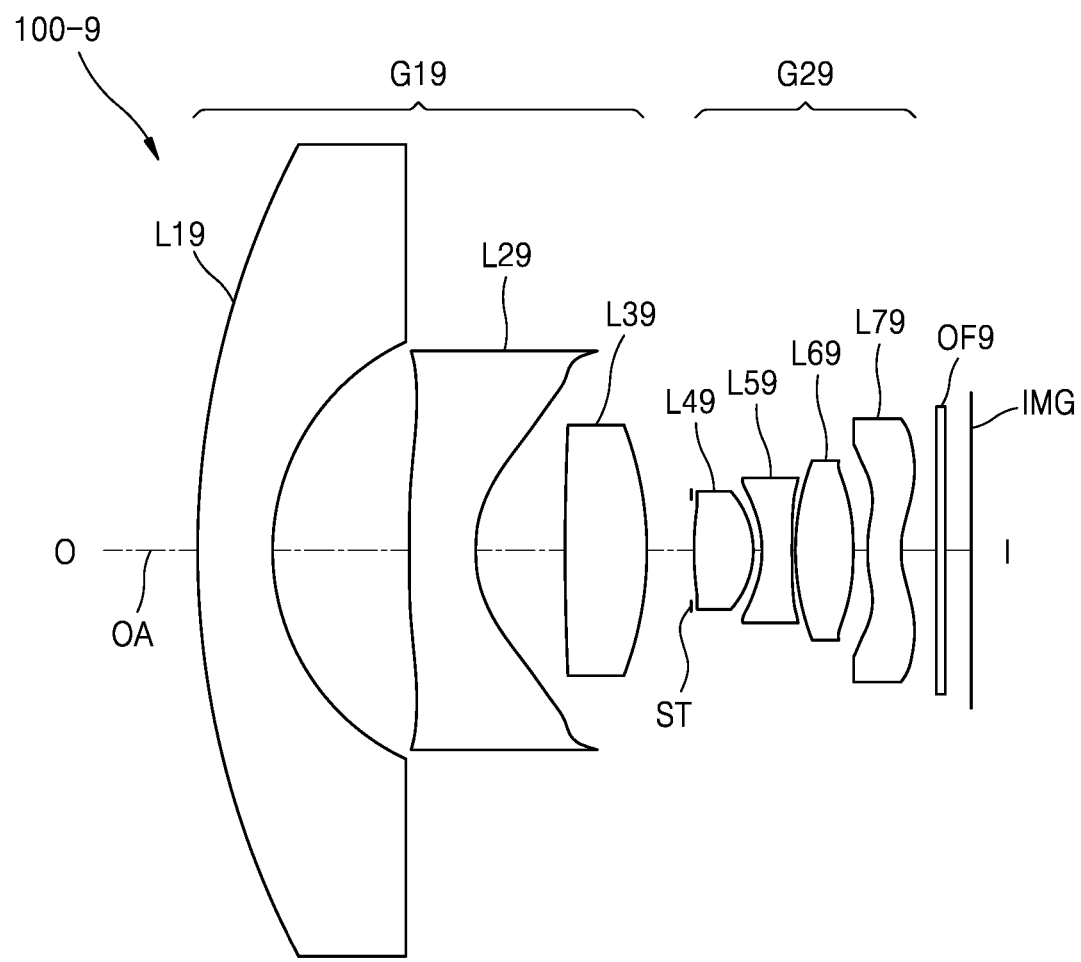
FIG. 17 illustrates an optical lens assembly of a ninth numerical embodiment according to various embodiments.

FIG. 17 illustrates an optical lens assembly 100-9 of a ninth numerical embodiment according to various embodiments.

According to various embodiments, the optical lens assembly 100-9 may include a first lens group G19 and a second lens group G29 arranged from the object side O toward the image side I. A stop ST may be between the first lens group G19 and the second lens group G29. For example, the first lens group G19 may have positive refractive power. For example, the second lens group G29 may have positive refractive power.

According to various embodiments, the first lens group G19 may include a first lens L19, a second lens L29, and a third lens L39 that are arranged from the object side O toward the image side I. For example, the first lens L19 may have negative refractive power. For example, the first lens L19 may have a meniscus shape convex toward the object side O. For example, the second lens L29 may have negative refractive power. For example, the second lens L29 may have a meniscus shape convex toward the object side O. The third lens L39 may have positive refractive power. For example, the third lens L39 may be a biconvex lens.

At least one of the first lens L19, the second lens L29, and the third lens L39 may be an aspheric lens. For example, the second lens L29 and the third lens L39 may be aspheric lenses.

The second lens group G29 may include at least three lenses. Sequentially from the object side O, these lenses may include a fourth lens L49 having positive refractive power, a fifth lens L59 having negative refractive power, a sixth lens L69 having positive refractive power, and a seventh lens L79. The fourth lens L49 may be a biconvex lens. The fifth lens L59 may be a biconcave lens. The sixth lens L69 may be a biconvex lens. The seventh lens L79 may have positive or negative refractive power. The seventh lens L79 may have a meniscus shape convex toward the object side O in the region near an optical axis OA. The seventh lens L79 may have at least one inflection point on its object-side surface and at least one inflection point on its image-side surface. According to various embodiments, all the lenses of the second lens group G29 may be bi-aspheric lenses. According to various embodiments, at least one optical element OF9 may be between the seventh lens L79 and an image plane IMG.

Figure 19:
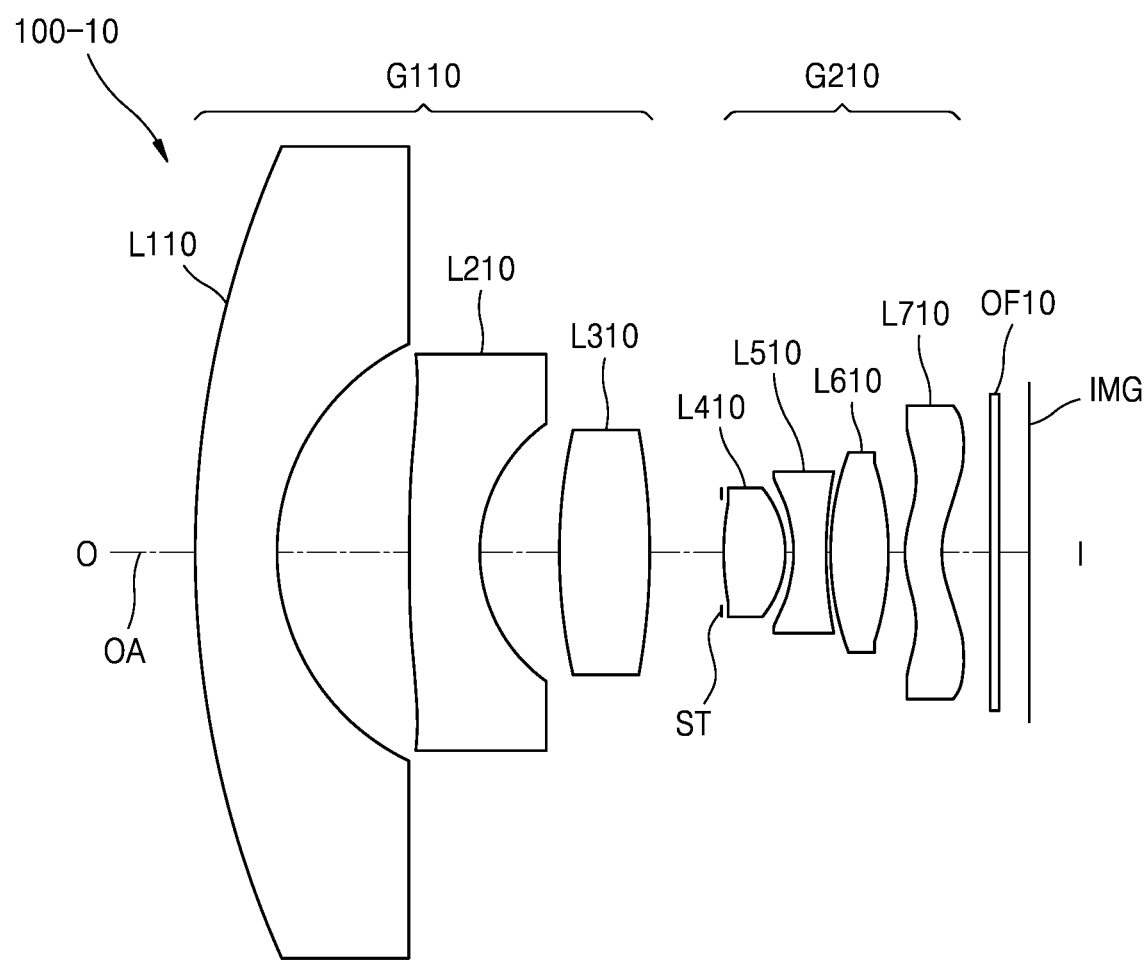
FIG. 19 illustrates an optical lens assembly of a tenth numerical embodiment according to various embodiments.

FIG. 19 illustrates an optical lens assembly 100-10 of a tenth numerical embodiment according to various embodiments.

According to various embodiments, the optical lens assembly 100-10 may include a first lens group G110 and a second lens group G210 arranged from the object side O toward the image side I. A stop ST may be between the first lens group G110 and the second lens group G210. For example, the first lens group G110 may have negative refractive power. For example, the second lens group G210 may have positive refractive power.

According to various embodiments, the first lens group G110 may include a first lens L110, a second lens L210, and a third lens L310 that are arranged from the object side O toward the image side I. For example, the first lens L110 may have negative refractive power. For example, the first lens L110 may have a meniscus shape convex toward the object side O. For example, the second lens L210 may have negative refractive power. For example, the second lens L210 may have a meniscus shape convex toward the object side O. The third lens L310 may have positive refractive power. For example, the third lens L310 may be a biconvex lens.

At least one of the first lens L110, the second lens L210, and the third lens L310 may be an aspheric lens. For example, the second lens L210 and the third lens L310 may be aspheric lenses.

The second lens group G210 may include at least three lenses. Sequentially from the object side O, these lenses may include a fourth lens L410 having positive refractive power, a fifth lens L510 having negative refractive power, a sixth lens L610 having positive refractive power, and a seventh lens L710. The fourth lens L410 may be a biconvex lens. The fifth lens L510 may be a biconcave lens. The sixth lens L610 may be a biconvex lens. The seventh lens L710 may have positive or negative refractive power. The seventh lens L710 may have a meniscus shape convex toward the object side O in the region near an optical axis OA. The seventh lens L710 may have at least one inflection point on its object-side surface and at least one inflection point on its image-side surface. According to various embodiments, all the lenses of the second lens group G210 may be bi-aspheric lenses. According to various embodiments, at least one optical element OF10 may be between the seventh lens L710 and an image plane IMG.

The optical lens assemblies of the various embodiments including a first lens group having positive or negative refractive power, a stop, and a second lens group having positive refractive power may be fixed focus optical systems. In addition, the optical lens assemblies may be fisheye optical lens systems having a field of view within the range of about 130° or greater. The optical lens assemblies of the various embodiments may have a field of view within the range of about 180° or greater. The optical lens assemblies may provide a super wide field of view for photographing. The optical lens assemblies of the various embodiments may be applied to apparatuses such as surveillance cameras, automotive cameras, action cams, etc. The optical lens assemblies of the various embodiments may have a wide field of view without zooming from wide angle end to a telephoto end.

According to the various embodiments, two negative meniscus lenses may be included object-side in the first lens group to provide for a small optical system. In addition, three or more lenses may be included in the second lens group to easily correct spherical aberration and chromatic aberration. In addition, the object-side surface and the image-side surface of the lens closest to the image side I may be designed to have aspheric shapes convex toward the object side O in the center region of the lens and concave toward the object side O in the peripheral region of the lens, in order to correct astigmatic aberration. This also allows the angle of incidence of rays on the image plane IMG to be large, thereby making it possible to provide for a small optical system.

In addition, photographing may be possible in all directions by using two or more of these optical lens assemblies. Images captured in all directions may be used for virtual reality (VR) or augmented reality (AR).

The optical lens assemblies of the various embodiments may satisfy the following conditions. The following conditions will be described with reference to the optical lens assembly 100-1 of the first numerical embodiment. However, the following conditions may be applied to other embodiments in the same manner.

$1.5 \leq f_2/f \leq 5.5$ <Condition 1> where $f_2$ denotes the focal length of the second lens group G21, and f denotes the focal length of the optical lens assembly 100-1.

Condition 1 specifies the ratio of the focal length of the second lens G21 to the total focal length of the optical lens assembly 100-1. If $f_2/f$ exceeds the upper limit of Condition 1, the focal length of the second lens group G21 is excessive relative to the total focal length, and thus the total length of the optical lens assembly 100-1 increases, making it difficult to reduce the size of the optical lens assembly 100-1. Conversely, if $f_2/f$ is less than the lower limit of Condition 1, the optical lens assembly 100-1 may be small in size, but the power of the second lens group G21 increases, which may cause large temperature-dependent variations in focus and cause aberrations in the optical lens assembly 100-1.

The optical lens assemblies of the various embodiments may satisfy the following condition.

$1.8 \leq N_{1p}$ <Condition 2> where $N_{1p}$ denotes the refractive index of the first positive lens of the first lens group G11 from the object side O at the d-line wavelength. The d-line wavelength is 587.5600 nanometers (NM).

If the first lens group G11 satisfies Condition 2, axial chromatic aberration may be easily corrected, and the second lens group G21 may be small in size.

The optical lens assemblies of the various embodiments may satisfy the following condition.

$25 \leq (V_{21})-(V_{22}) \leq 40$ <Condition 3> where $V_{21}$ denotes the Abbe number of the first lens of the second lens group G21 from the object side O, and $V_{22}$ denotes the Abbe number of the second lens of the second lens group G21 from the object side O.

If $(V_{21})-(V_{22})$ exceeds the upper limit of Condition 3, chromatic aberration may easily be corrected owing to a large Abbe number difference between the first and second lenses of the second lens group G21 from the object side O, that is, the fourth lens L41 and the fifth lens L51 of the optical lens assembly 100-1. However, material costs may increase, and thus the unit cost for the lens assembly may increase. If $(V_{21})-(V_{22})$ is less than the lower limit of Condition 3, it may be difficult to correct chromatic aberration.

The optical lens assemblies of the various embodiments may satisfy the following condition.

$0.6 < f_2/f_{1p} < 1.6$ <Condition 4> where $f_2$ denotes the focal length of the second lens group G21, and $f_{1p}$ denotes the focal length of the first positive lens of the first lens group G11 from the object side O.

If the optical lens assemblies of the various embodiments satisfy Condition 4, external temperature variations may be compensated for, and the sensitivity of the optical lens assemblies may be maintained at acceptable levels. If $f_2/f_{1p}$ is less than the lower limit of Condition 4, it is difficult to compensate for focus variations caused by temperature variations. If $f_2/f_{1p}$ exceeds the upper limit of Condition 4, although the effect of compensating for temperature variations is high, the sensitivity of the optical system increases, and thus manufacture of the optical system may be difficult.

The optical lens assemblies of the various embodiments may satisfy the following conditions.

$1.73 < N_{1p} < 1.85$ <Condition 5>

$29 < V_{1p} < 55$ <Condition 6>

$2.0 < f_{1p}/f < 4.0$ <Condition 7> where $N_{1p}$ denotes the refractive index of the first positive lens of the first lens group G11 from the object side O, $V_{1p}$ denotes the Abbe number of the first positive lens of the first lens group G11 from the object side O, f denotes the focal length of the optical lens assembly 100-1, and $f_{1p}$ refers to the focal length of the first positive lens of the first lens group G11 from the object side O.

If the optical lens assemblies satisfy Conditions 5, 6, and 7, temperature variations may easily be compensated for. For example, when the optical lens assembly 100-1 is used as an omnidirectional camera, equidistance or stereography type mapping functions may be used to project spherical images onto planes or vice versa. In this case, an aspheric lens having positive refractive power and made of a material satisfying Conditions 5 and 6 may be included in the first lens group G11 so as to perform temperature compensation while ensuring peripheral magnification.

If $f_{1p}/f$ is less than the lower limit of Condition 7, the focus sensitivity of the first positive lens of the first lens group G11 from the object side O is high, and thus temperature compensation may be easily performed. However, this results in difficulties in the manufacture of the optical system due to high manufacturing sensitivity. Conversely, if $f_{1p}/f$ exceeds the upper limit of Condition 7, temperature compensation may not be easily performed.

The optical lens assemblies of the various embodiments may satisfy the following condition.

$$0 < (RA_{1p\_bestfit} - RA_{1p})/RA_{1p} < 1.5 \quad \text{<Condition 8>}$$

where $RA_{1p\_bestfit}$ denotes the best fit radius of curvature of the object-side surface of the first positive lens of the first lens group G11 from the object side O, and $RA_{1p}$ denotes the radius of curvature of the object-side surface of the first positive lens of the first lens group G11 from the object side O. $RA_{1p}$ is the reciprocal of c (1/c) in the aspheric condition (refer to Condition 12), and the best fit radius of curvature refers to the radius of a sphere connecting the vertex of a lens center portion and a peripheral boundary portion of a lens.

If the optical lens assembly satisfies Condition 8, function mapping and temperature compensation may be balanced. If $[(RA_{1p\_bestfit} - RA_{1p})/RA_{1p}]$ exceeds the upper limit of Condition 8, aspheric surfaces may have high sensitivity to eccentricity, and thus it may be difficult to manufacture the optical lens assemblies.

The optical lens assemblies of the various embodiments may satisfy the following condition.

$$25 \leq (V_{23}) - (V_{24}) \leq 40 \quad \text{<Condition 9>}$$

where $V_{23}$ denotes the Abbe number of the third lens of the second lens group G21 from the object side O, and $V_{24}$ denotes the Abbe number of the fourth lens of the second lens group G21 from the object side O.

As described above, the second lens group G21 may include, sequentially from the object side O, a fourth lens L41 being an aspheric plastic lens having positive refractive power, a fifth lens L51 being an aspheric plastic lens having negative refractive power, a sixth lens L61 being an aspheric plastic lens having positive refractive power, and a seventh lens L71 being an aspheric plastic lens having negative refractive power. If $[(V_{23} - V_{24})]$ exceeds the upper limit of Condition 9, chromatic aberration may easily be corrected, but material costs may increase. Conversely, if $[(V_{23} - V_{24})]$ is less than the lower limit of Condition 9, it may be difficult to correct chromatic aberration.

The optical lens assemblies of the various embodiments may satisfy the following conditions.

$$6.0 < |f_{21-22}/f| \quad \text{<Condition 10>}$$

$$2.0 \leq f_{23-24}/f < 3.5 \quad \text{<Condition 11>}$$

where $f_{21-22}$ denotes the combined focal length of the first and second lenses of the second lens group G21 from the object side O, $f_{23-24}$ denotes the combined focal length of the third and fourth lenses of the second lens group G21 from the object side O.

When the optical lens assemblies satisfy Conditions 10 and 11, axial chromatic aberration and lateral chromatic aberration may easily be corrected.

For example, the optical lens assemblies of the various embodiments may be used in imaging devices. For example, two or more of the optical lens assemblies of the various embodiments may be included in an imaging device for $4\pi$ radian photographing in all directions.

For example, if the optical lens assemblies of the various embodiments have a field of view within the range of about 130° or greater, images perpendicular to the optical axis may be obtained. If it is possible to obtain images perpendicular to the optical axis, images may be obtained in the range of up to 360°. For example, when two of the optical lens assemblies of the various embodiments are arranged at 180° with each other, that is, arranged in opposite directions on a straight line, images may be obtained at a maximum spherical field of view of $4\pi$ radian. This makes it possible to implement an omnidirectional optical system capable of capturing images in the entire spherical range as well as capturing images in a horizontal 360° range perpendicular to the optical axis.

In another example of an omnidirectional optical system, a regular polyhedron is used. When the number of faces of the regular polyhedron is N, N optical lens assemblies of the various embodiments may be respectively placed at vertexes of the regular polyhedron. In this case, the omnidirectional optical system capable of photographing the entire sphere surrounding a photographer may be implemented by orienting the N optical lens assemblies in parallel with straight lines extending from the center to the vertexes of the regular polyhedron, and stitching the plurality of images captured using the N optical lens assemblies.

In addition, an omnidirectional optical system capable of photographing the entire sphere surrounding a photographer may be implemented by assuming a plane parallel to the ground, placing a regular polygon having M sides in the plane, arranging M or 2M optical lens assemblies with the optical axes being parallel with straight lines extending from the center to the vertexes of the regular polygon, and stitching images obtained using the optical lens assemblies.

In the descriptions of the optical lens assemblies of the various embodiments, the term "aspheric" or "aspheric surface" has the following definition.

When an optical axis is set as an x-axis, a direction perpendicular to the optical axis is set as a y-axis, and the propagation direction of rays is denoted as a positive direction, an aspheric surface of a lens may be defined by the following condition. In condition 12, x denotes a distance measured from the vertex of the lens in the direction of the optical axis of the lens, y denotes a distance measured from the optical axis in a direction perpendicular to the optical axis, K denotes a conic constant, A, B, C, D, . . . denote aspheric coefficients, and c denotes the reciprocal (1/R) of the radius of curvature at the vertex of the lens.

$$x = \frac{cy^2}{1 + \sqrt{1 - (K+1)c^2 y^2}} + Ay^4 + By^6 + Cy^8 + Dy^{10} + \ldots \quad \text{<Condition 12>}$$

In the present disclosure, various optical lens assemblies may be implemented according to numerical embodiments as described below.

In the following numerical embodiments, lens surfaces are sequentially numbered with 1, 2, 3, . . . , n in the direction from the object side O to the image side I where n is a positive integer. Lens surface numbers are shown only in FIG. 1. That is, lens surface numbers are not shown in the other drawings illustrating other embodiments. In addition, f refers to the focal length of the optical lens assembly, FNO refers to F-number, 2ω refers to the maximum field of view, R refers to radius of curvature, Dn refers to lens thickness or air gap between lenses, Nd refers to refractive index, and Vd refers to Abbe number. In addition, ST refers to the stop, and OBJ refers to the object. ASP refers to aspheric surface.

First Numerical Embodiment

FIG. 1 illustrates the optical lens assembly 100-1 of the first numerical embodiment according to various embodiments, and, for example, Table 1 shows design data of the first numerical embodiment.
f; 1.051 FNO; 2.08 2ω; 195

TABLE 1

| Lens Surfaces | R(mm) | Dn(mm) | Nd | Vd |
|---|---|---|---|---|
| OBJ: | INFINITY | INFINITY | | |
| 1: | 15.54300 | 0.800000 | 1.516798 | 64.1983 |
| 2: | 2.47700 | 1.281000 | | |
| 3: | 4.32900 | 0.500000 | 1.739860 | 49.0949 |

ASP:
K: −17.382392
A: 0.640775E−01 B: −0.280900E−01 C: 0.422255E−02
D: −0.222209E−03

| 4: | 1.50600 | 1.972000 | | |
|---|---|---|---|---|

ASP:
K: −0.843937
A: 0.963371E−01 B: −0.259619E−01 C: −0.914866E−02
D: 0.355157E−02

| 5: | 4.54800 | 1.050000 | 1.834805 | 42.7218 |
|---|---|---|---|---|
| 6: | −4.54800 | 0.266000 | | |
| ST: | INFINITY | 0.270000 | | |
| 8: | 3.31000 | 0.809000 | 1.544100 | 56.0928 |

ASP:
K: −4.073816
A: −0.410326E−01 B: −0.680712E−01 C: 0.680050E−01
D: −0.235358E+00

| 9: | −1.72365 | 0.050000 | | |
|---|---|---|---|---|

ASP:
K: 0.470431
A: −0.435031E−01 B: −0.669139E−02 C: −0.109565E+00
D: 0.447558E−01

| 10: | −1.91153 | 0.560000 | 1.651000 | 21.4851 |
|---|---|---|---|---|

ASP:
K: −4.067847
A: −0.402619E−01 B: 0.124674E+00 C: −0.311023E+00
D: 0.223245E+00

| 11: | 2.50390 | 0.050000 | | |
|---|---|---|---|---|

ASP:
K: −11.539065
A: 0.828766E−02 B: 0.928242E−01 C: −0.878552E−01
D: 0.295643E−01

TABLE 1-continued

| Lens Surfaces | R(mm) | Dn(mm) | Nd | Vd |
|---|---|---|---|---|
| 12: | 1.94683 | 0.767000 | 1.544100 | 56.0928 |

ASP:
K: −6.921834
A: 0.301280E−01 B: −.755115E−02 C: 0.943065E−02
D: −0.907760E−02

| 13: | −3.37938 | 0.050000 | | |
|---|---|---|---|---|

ASP:
K: −47.606023
A: 0.204785E−01 B: 0.150353E−01 C: 0.103186E−01
D: −0.136306E−01

| 14: | 2.46824 | 0.419000 | 1.544100 | 56.0928 |
|---|---|---|---|---|

ASP:
K: −8.656465
A: −0.149761E+00 B: −0.219173E−01 C: 0.686914E−01
D: −0.286415E−01

| 15: | 1.51268 | 0.696739 | | |
|---|---|---|---|---|

ASP:
K: −6.108667
A: −0.134631E+00 B: 0.346428E−01 C: −0.585246E−02
D: 0.220993E−03

| 16: | INFINITY | 0.110000 | 1.516798 | 64.1983 |
|---|---|---|---|---|
| 17: | INFINITY | 0.329453 | | |
| IMG: | INFINITY | | | |

Figure 2:
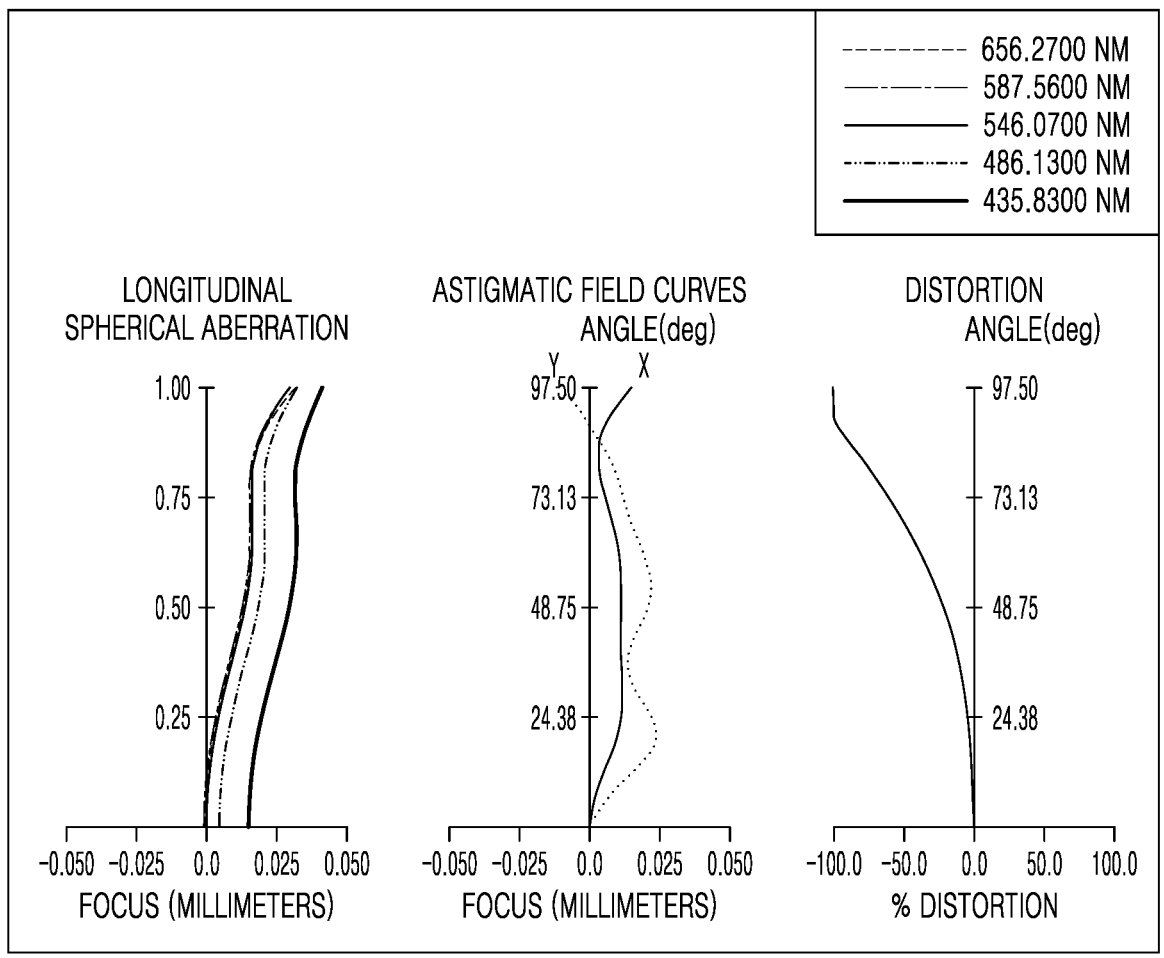
FIG. 2 illustrates aberration diagrams of the optical lens assembly of the first numerical embodiment according to various embodiments.

FIG. 2 illustrates longitudinal spherical aberration, astigmatic field curves, and distortion of the optical lens assembly 100-1 of the first numerical embodiment. For example, the longitudinal spherical aberration was measured with light having wavelengths of 656.2700 nanometers (NM), 587.5600 NM, 546.0700 NM, 486.1300 NM, and 435.8300 NM, and the astigmatic field curves include a tangential field curvature T and a sagittal field curvature S. The astigmatic field curves were measured with light having wavelengths of 587.5600 NM, and the distortion was measured with light having a wavelength of 587.5600 NM.

Second Numerical Embodiment

FIG. 3 illustrates the optical lens assembly 100-2 of the second numerical embodiment according to various embodiments, and, for example, Table 2 shows design data of the second numerical embodiment.
f; 1.16 FNO; 2.28 2ω; 195

TABLE 2

| Lens Surfaces | R(mm) | Dn(mm) | Nd | Vd |
|---|---|---|---|---|
| OBJ: | INFINITY | INFINITY | | |
| 1: | 13.58100 | 1.400000 | 1.5167983 | 64.197 |
| 2: | 2.73200 | 1.557000 | | |
| 3: | 13.92100 | 0.520000 | 1.73986 | 49.30949 |

ASP:
K: −65.887446
A: 0.209500E−01 B: −0.928122E−02 C: 0.161877E−02
D: −0.144437E−03 E: 0.673121E−05 F: −0.145615E−06

TABLE 2-continued

| Lens Surfaces | R(mm) | Dn(mm) | Nd | Vd |
|---|---|---|---|---|
| 4: | 1.65900 | 1.969000 | | |

ASP:
K: −0.682501
A: 0.405406E−01 B: 0.255497E−02 C: −0.128599E−01
D: 0.449597E−02 E: −0.559274E−03 F: 0.282816E−04

| | | | | |
|---|---|---|---|---|
| 5: | 2.98000 | 1.030000 | 1.9108227 | 35.2494 |
| 6: | −15.20700 | 0.316000 | | |
| 7: | INFINITY | 0.320000 | | |
| ST: | 3.02110 | 0.739000 | 1.5441 | 56.0927 |

ASP:
K: −9.988609
A: −0.421777E−01 B: −0.208814E+00 C: 0.395934E+00
D: −0.117944E+01

| | | | | |
|---|---|---|---|---|
| 9: | −1.65144 | 0.059000 | | |

ASP:
K: 2.415819
A: −0.308764E+00 B: 0.385067E+00 C: −0.223323E+00
D: −0.499960E−01

| | | | | |
|---|---|---|---|---|
| 10: | −1.16258 | 0.400000 | 1.6510 | 21.485 |

ASP:
K: −2.841596
A: −0.669478E−01 B: 0.155864E+00 C: −0.285053E+00
D: 0.154952E+00

| | | | | |
|---|---|---|---|---|
| 11: | −18.14940 | 0.052000 | | |

ASP:
K: −99.000000
A: 0.218808E+00 B: −0.139984E+00 C: 0.116754E+00
D: −0.106454E+00 E: 0.380629E−01

| | | | | |
|---|---|---|---|---|
| 12: | 1.91784 | 0.744000 | 1.5441 | 56.0927 |

ASP:
K: −5.612810
A: −0.413899E−02 B: −0.323679E−01 C: 0.542618E−01
D: −0.305312E−01 E: 0.595630E−02

| | | | | |
|---|---|---|---|---|
| 13: | 23.92726 | 0.079000 | | |

ASP:
K: 99.000000
A: −.178718E+00 B: 0.202080E+00 C: −.246891E+00
D: 0.170593E+00 E: −.380127E−01

| | | | | |
|---|---|---|---|---|
| 14: | 1.85634 | 0.427000 | 1.5348 | 55.708 |

ASP:
K: −19.248589
A: −0.192825E+00 B: −0.220985E−01 C: −0.239430E−01
D: 0.106396E+00 E: −0.515822E−01 F: 0.725623E−02

| | | | | |
|---|---|---|---|---|
| 15: | 1.68963 | 0.678000 | | |

ASP:
K: −14.801559
A: −0.499765E−01 B: −0.107591E+00 C: 0.117349E+00
D: −0.506357E−01 E: 0.107605E−01 F: −0.103947E−02

| | | | | |
|---|---|---|---|---|
| 16: | INFINITY | 0.110000 | 1.516798 | 64.197 |
| 17: | INFINITY | 0.347504 | | |
| IMG: | INFINITY | | | |

Figure 4:
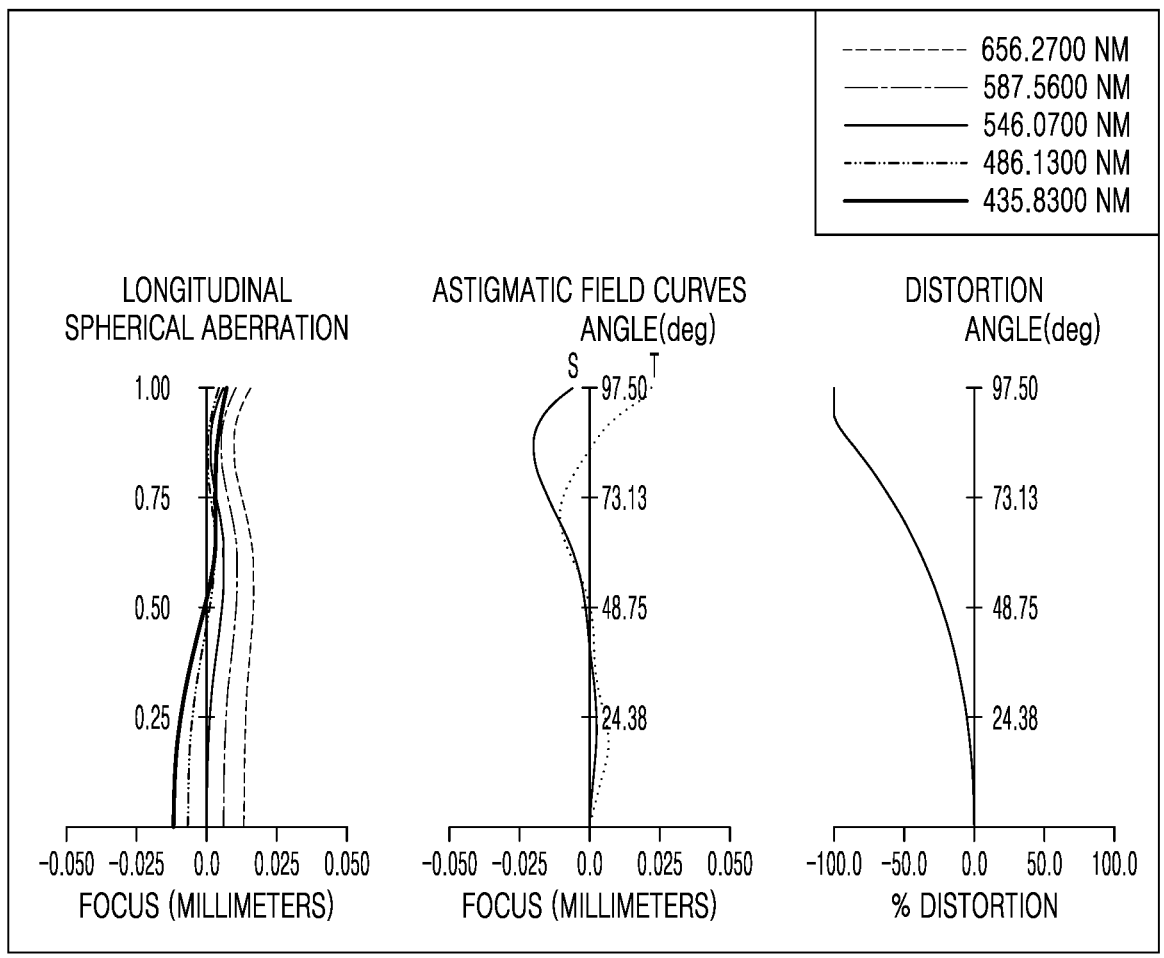
FIG. 4 illustrates aberration diagrams of the optical lens assembly of the second numerical embodiment according to various embodiments.

FIG. 4 illustrates longitudinal spherical aberration, astigmatic field curves, and distortion of the optical lens assembly 100-2 of the second numerical embodiment.

Third Numerical Embodiment

FIG. 3 illustrates the optical lens assembly 100-3 of the third numerical embodiment according to various embodiments, and, for example, Table 3 shows design data of the third numerical embodiment.

f; 1.24 FNO; 2.07 2ω; 195

TABLE 3

| Lens Surfaces | R(mm) | Dn(mm) | Nd | Vd |
|---|---|---|---|---|
| OBJ: | INFINITY | INFINITY | | |
| 1: | 13.99800 | 0.700000 | 1.729160 | 54.6735 |
| 2: | 2.70000 | 1.056000 | | |
| 3: | 1.73954 | 0.400000 | 1.544100 | 56.0928 |

ASP:
K: −1.129850
A: −0.487138E−01 B: 0.113319E−02 C: 0.452245E−03
D: −0.285419E−04

| | | | | |
|---|---|---|---|---|
| 4: | 0.86475 | 1.694000 | | |

ASP:
K: −0.923734
A: −0.460091E−01 B: −0.151260E−01 C: 0.251060E−02
D: 0.376550E−03

| | | | | |
|---|---|---|---|---|
| 5: | 3.25400 | 1.150000 | 1.834805 | 42.7218 |
| 6: | −11.68800 | 0.707000 | | |
| ST: | INFINITY | 0.113000 | | |
| 8: | 2.56014 | 0.924000 | 1.544100 | 56.0928 |

ASP:
K: −1.331911
A: −0.362233E−01 B: −0.117110E+00 C: 0.253705E+00
D: −0.598218E+00

| | | | | |
|---|---|---|---|---|
| 9: | −1.31817 | 0.061000 | | |

ASP:
K: 0.702326
A: 0.278226E−01 B: 0.357437E−01 C: −0.178962E+00
D: 0.131552E+00

| | | | | |
|---|---|---|---|---|
| 10: | −1.16987 | 0.400000 | 1.651000 | 21.4851 |

ASP:
K: −2.819068
A: 0.661356E−01 B: −0.197971E−01 C: −0.318434E+00
D: 0.283804E+00

| | | | | |
|---|---|---|---|---|
| 11: | −178.69605 | 0.042000 | | |

ASP:
K: 99.000000
A: 0.693533E−01 B: 0.422977E−01 C: −0.651776E−01
D: 0.277398E−01

| | | | | |
|---|---|---|---|---|
| 12: | 1.68516 | 0.571000 | 1.544100 | 56.0928 |

ASP:
K: −5.983090
A: 0.102144E−01 B: −0.183510E−02 C: −0.282294E−02
D: −0.199358E−02

| | | | | |
|---|---|---|---|---|
| 13: | 2.69636 | 0.158000 | | |

ASP:
K: −8.16223
A: 0.587977E−02 B: −0.344574E−02 C: −0.221578E−02
D: −0.123698E−02

TABLE 3-continued

| Lens Surfaces | R(mm) | Dn(mm) | Nd | Vd |
|---|---|---|---|---|
| 14: | 1.58078 | 0.564000 | 1.544100 | 56.0928 |

ASP:
K: −6.295668
A: −0.755875E−01 B: −0.365516E−02 C: 0.537093E−03
D: 0.246945E−03

| | | | | |
|---|---|---|---|---|
| 15: | 2.11300 | 0.500000 | | |

ASP:
K: −3.549800
A: −0.725461E−01 B: 0.750126E−02 C: −0.287088E−02
D: 0.545493E−03

| | | | | |
|---|---|---|---|---|
| 16: | INFINITY | 0.110000 | 1.516798 | 64.1983 |
| 17: | INFINITY | 0.346961 | | |
| IMG: | INFINITY | | | |

Figure 6:
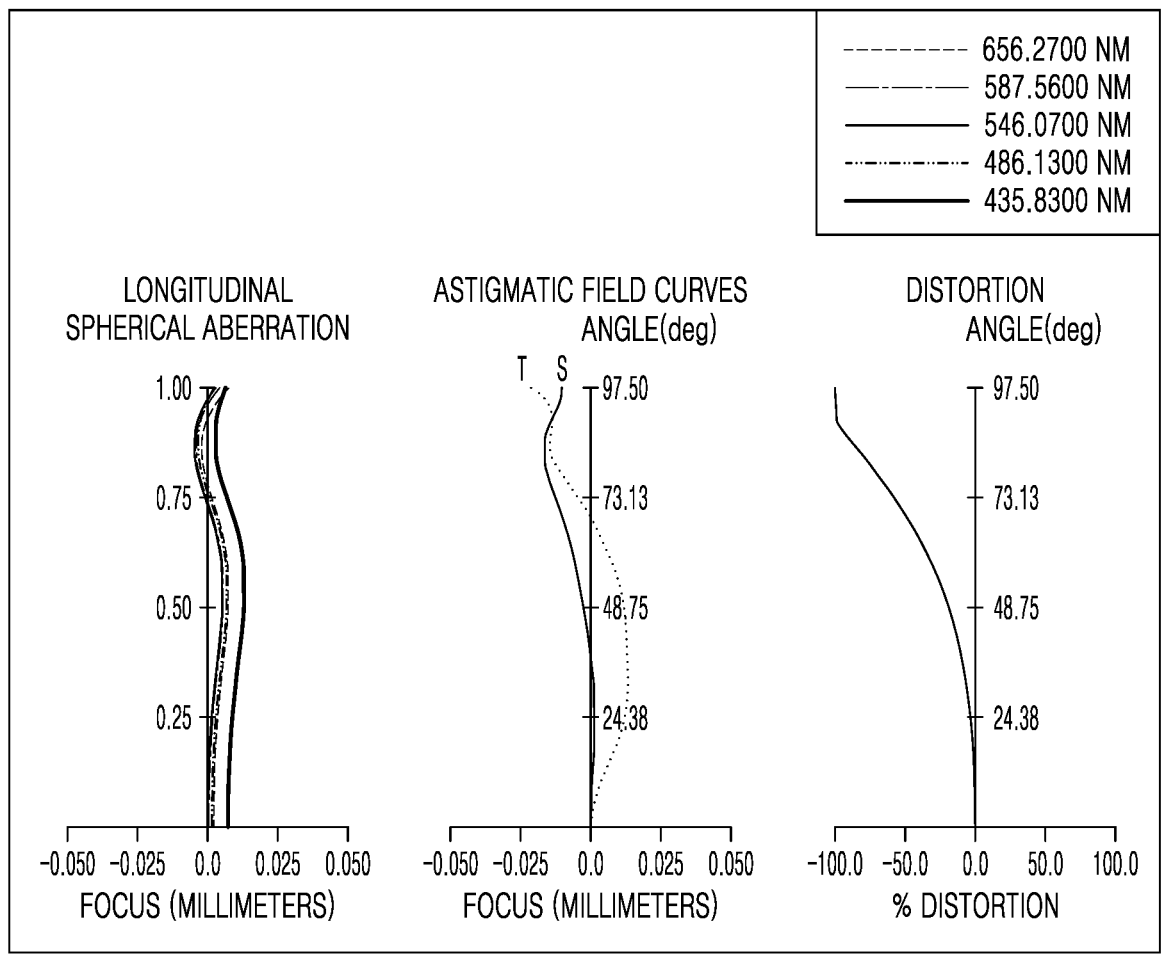
FIG. 6 illustrates aberration diagrams of the optical lens assembly of the third numerical embodiment according to various embodiments.

FIG. 6 illustrates longitudinal spherical aberration, astigmatic field curves, and distortion of the optical lens assembly 100-3 of the third numerical embodiment.

Fourth Numerical Embodiment

FIG. 7 illustrates the optical lens assembly 100-4 of the fourth numerical embodiment according to various embodiments, and, for example, Table 4 shows design data of the fourth numerical embodiment.

f; 1.33 FNO; 2.28 2ω; 195

TABLE 4

| Lens Surfaces | R(mm) | Dn(mm) | Nd | Vd |
|---|---|---|---|---|
| OBJ: | INFINITY | INFINITY | | |
| 1: | 9.76000 | 0.550000 | 1.729160 | 54.6735 |
| 2: | 2.30000 | 1.332000 | | |
| 3: | 10.85689 | 0.750000 | 1.544100 | 56.0928 |

ASP:
K: 7.726348
A: 0.510462E−01 B: −0.206773E−01 C: 0.203725E−02
D: −0.705481E−05

| | | | | |
|---|---|---|---|---|
| 4: | 2.19861 | 1.206000 | | |

ASP:
K: 1.153969
A: 0.109806E+00 B: −0.360369E−01 C: 0.569493E−02
D: −0.370407E−02

| | | | | |
|---|---|---|---|---|
| 5: | 16.22400 | 1.260000 | 1.834805 | 42.7218 |
| 6: | −3.24500 | 0.200000 | | |
| ST: | INFINITY | 0.050000 | | |
| 8: | 2.52520 | 1.163000 | 1.544100 | 56.0928 |

ASP:
K: −0.153530
A: −0.300304E−01 B: −0.807299E−01 C: 0.166620E+00
D: −0.365327E+00

| | | | | |
|---|---|---|---|---|
| 9: | −1.16609 | 0.050000 | | |

ASP:
K: 0.124392
A: 0.669580E−01 B: 0.224207E−01 C: −0.999505E−01
D: 0.743262E−01

TABLE 4-continued

| Lens Surfaces | R(mm) | Dn(mm) | Nd | Vd |
|---|---|---|---|---|
| 10: | −1.36748 | 0.530000 | 1.651000 | 21.4851 |

ASP:
K: −5.248218
A: −0.588396E−01 B: 0.104213E+00 C: −0.351254E+00
D: 0.235933E+00

| | | | | |
|---|---|---|---|---|
| 11: | 18.02593 | 0.261000 | | |

ASP:
K: −99.000000
A: 0.143695E+00 B: 0.286292E−01 C: −0.981307E−01
D: 0.442852E−01

| | | | | |
|---|---|---|---|---|
| 12: | 2.03453 | 0.622000 | 1.544100 | 56.0928 |

ASP:
K: −8.391231
A: −0.380843E−01 B: 0.697263E−02 C: 0.112462E−01
D: −0.729159E−02

| | | | | |
|---|---|---|---|---|
| 13: | 2.28924 | 0.768958 | | |

ASP:
K: −0.648855
A: −0.106385E+00 B: 0.149738E−01 C: 0.479863E−02
D: −0.260948E−02

| | | | | |
|---|---|---|---|---|
| 14: | INFINITY | 0.110000 | 1.516798 | 64.1983 |
| 15: | INFINITY | 0.343955 | | |
| IMG: | INFINITY | | | |

Figure 8:
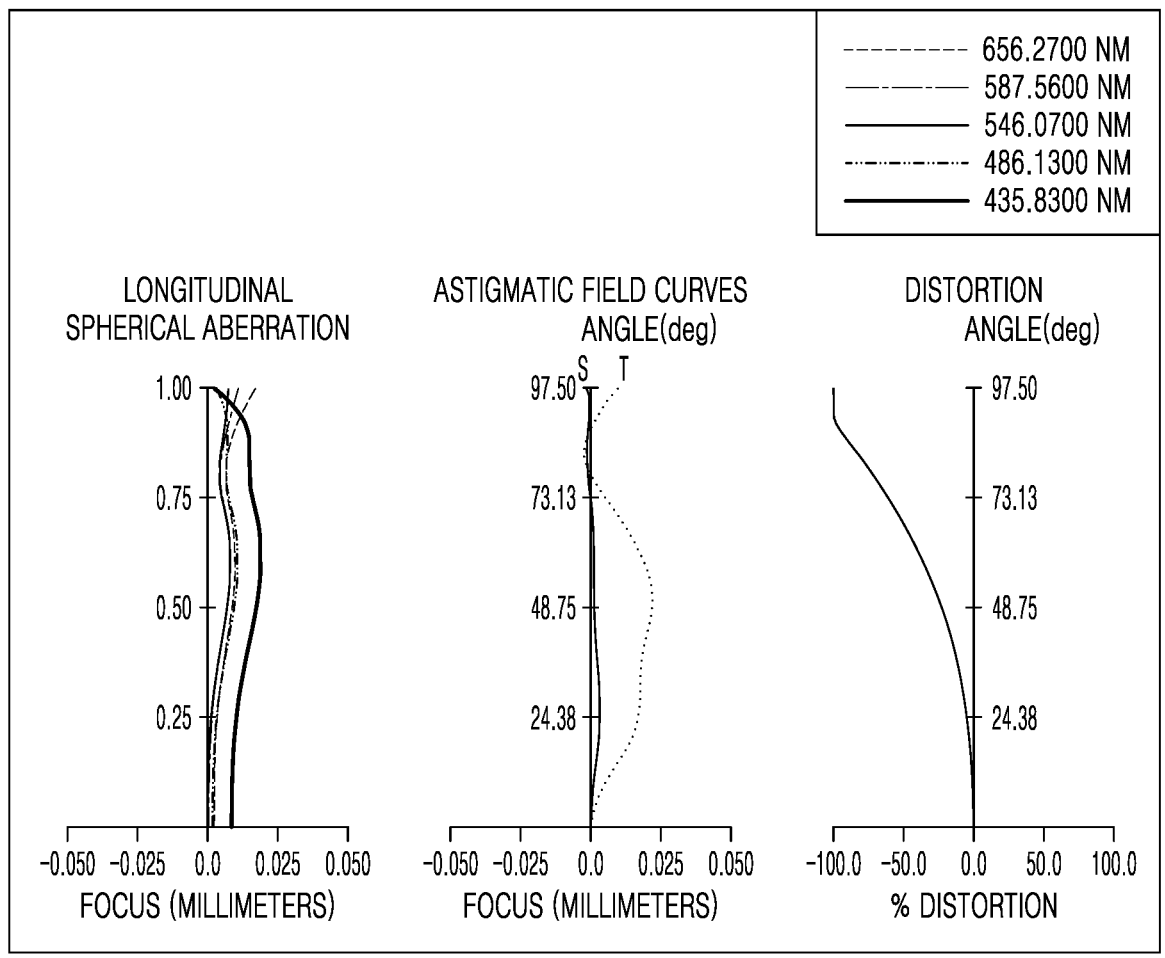
FIG. 8 illustrates aberration diagrams of the optical lens assembly of the fourth numerical embodiment according to various embodiments.

FIG. 8 illustrates longitudinal spherical aberration, astigmatic field curves, and distortion of the optical lens assembly 100-4 of the fourth numerical embodiment.

Fifth Numerical Embodiment

FIG. 9 illustrates the optical lens assembly 100-5 of the fifth numerical embodiment according to various embodiments, and, for example, Table 5 shows design data of the fifth numerical embodiment.

f; 0.97 FNO; 2.27 2ω; 195

TABLE 5

| Lens Surfaces | R(mm) | Dn(mm) | Nd | Vd |
|---|---|---|---|---|
| OBJ: | INFINITY | INFINITY | | |
| 1: | 20.00000 | 2.250000 | 1.516798 | 64.1983 |
| 2: | 15.00000 | 2.250000 | | |
| 3: | 13.99800 | 0.700000 | 1.729160 | 54.6735 |
| 4: | 2.70000 | 1.229441 | | |
| 5: | 2.17522 | 1.000000 | 1.544100 | 56.0928 |

ASP:
K: −0.634411
A: −0.257754E−01 B: −0.777871E−03 C: 0.175457E−03
D: −0.926417E−05

| | | | | |
|---|---|---|---|---|
| 6: | 0.78702 | 2.050149 | | |

ASP:
K: −0.924619
A: −0.269641E−01 B: −0.213976E−01 C: 0.426637E−02
D: −0.238733E−03

| | | | | |
|---|---|---|---|---|
| 7: | 3.25400 | 1.314802 | 1.834805 | 42.7218 |
| 8: | −11.68800 | 0.979771 | | |
| ST: | INFINITY | 0.050000 | | |
| 10: | 2.19808 | 0.990153 | 1.544100 | 56.0928 |

TABLE 5-continued

| Lens Surfaces | R(mm) | Dn(mm) | Nd | Vd |
|---|---|---|---|---|
| ASP: K: −0.775575 A: −0.310551E−01 B: −0.870697E−01 C: 0.167071E+00 D: −0.462873E+00 | | | | |
| 11: | −1.28587 | 0.050000 | | |
| ASP: K: 0.467503 A: −0.229528E−01 B: 0.809821E−02 C: −0.421672E−01 D: 0.212893E−01 | | | | |
| 12: | −1.33455 | 0.400000 | 1.651000 | 21.4851 |
| ASP: K: −0.692448 A: −0.716165E−02 B: 0.601662E−01 C: −0.286401E+00 D: 0.238064E+00 | | | | |
| 13: | 3.29870 | 0.050000 | | |
| ASP: K: −44.532811 A: 0.241567E−01 B: 0.499825E−01 C: −0.288871E−01 D: 0.257081E−02 | | | | |
| 14: | 1.65488 | 0.559187 | 1.544100 | 56.0928 |
| ASP: K: −6.659309 A: −0.148317E−01 B: 0.173240E−01 C: 0.502579E−02 D: −0.602897E−02 | | | | |
| 15: | 2.51666 | 0.069343 | | |
| ASP: K: −4.701856 A: −0.792013E−01 B: 0.251214E−01 C: 0.273354E−02 D: −0.291183E−02 | | | | |
| 16: | 1.48798 | 0.562670 | 1.544100 | 56.0928 |
| ASP: K: −5.872608 A: −0.281680E−01 B: −0.249801E−02 C: −0.279954E−02 D: −0.150945E−02 | | | | |
| 17: | 6.81283 | 0.534485 | | |
| ASP: K: 6.740140 A: 0.487719E−02 B: −0.119432E−01 C: −0.270418E−02 D: 0.695682E−03 | | | | |
| 18: | INFINITY | 0.110000 | 1.516798 | 64.1983 |
| 19: | INFINITY | 0.346522 | | |
| IMG: | INFINITY | | | |

Figure 10:
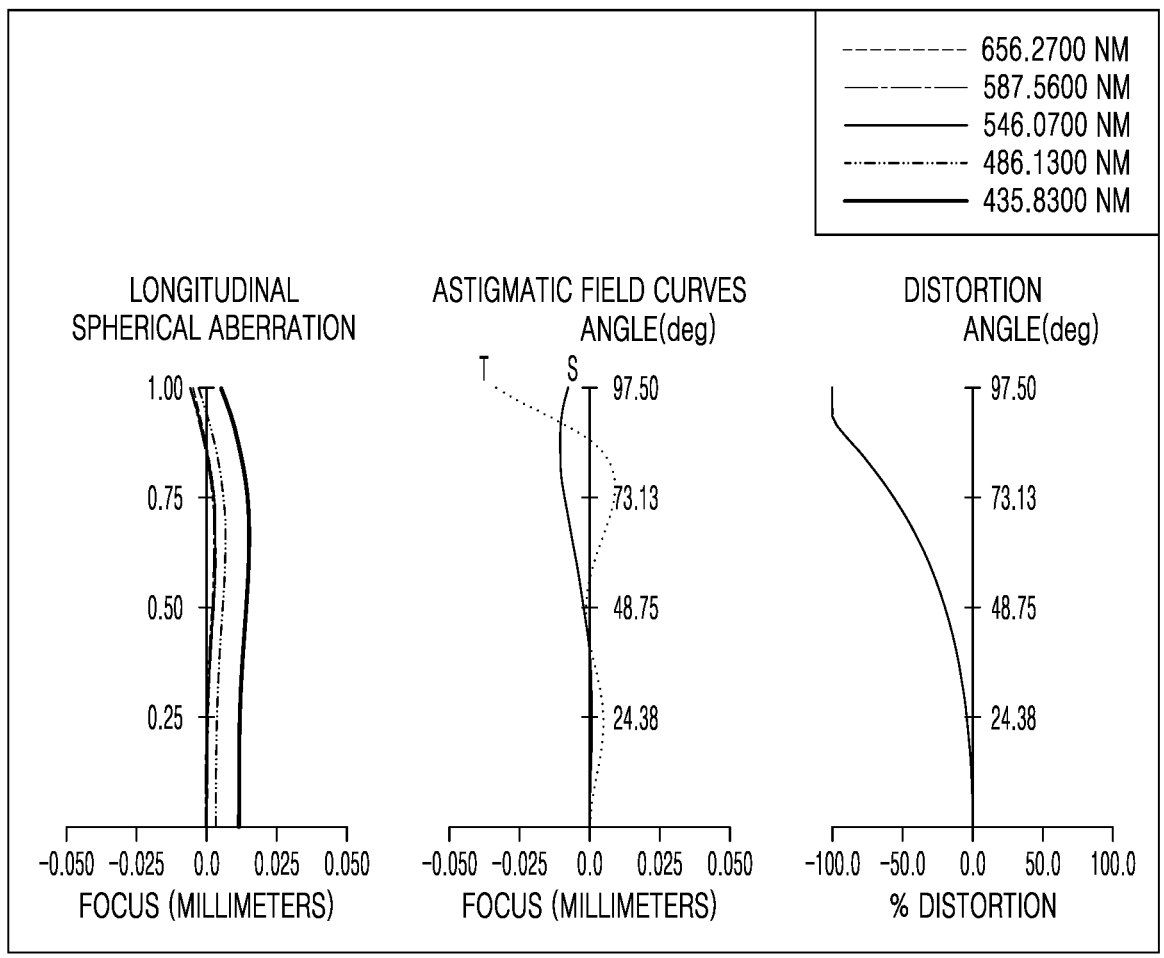
FIG. 10 illustrates aberration diagrams of the optical lens assembly of the fifth numerical embodiment according to various embodiments.

FIG. 10 illustrates longitudinal spherical aberration, astigmatic field curves, and distortion of the optical lens assembly 100-5 of the fifth numerical embodiment.

Sixth Numerical Embodiment

FIG. 11 illustrates the optical lens assembly 100-6 of the sixth numerical embodiment according to various embodiments, and, for example, Table 6 shows design data of the sixth numerical embodiment.

f; 1.08 FNO; 2.27 2ω; 195

TABLE 6

| Lens Surfaces | R(mm) | Dn(mm) | Nd | Vd |
|---|---|---|---|---|
| OBJ: | INFINITY | INFINITY | | |
| 1: | 20.00000 | 2.250000 | 1.516798 | 64.1983 |
| 2: | 15.00000 | 2.250000 | | |
| 3: | 10.73800 | 1.400000 | 1.729160 | 54.6735 |
| 4: | 2.69000 | 1.395000 | | |
| 5: | 6.07300 | 0.520000 | 1.739860 | 49.0948 |
| ASP: K: −7.652136 A: 0.185339E−01 B: −0.950485E−02 C: 0.163775E−02 D: −0.142930E−03 E: 0.673121E−05 F: −0.145615E−06 | | | | |
| 6: | 1.50100 | 2.179000 | | |
| ASP: K: −0.776269 A: 0.321456E−01 B: 0.129297E−02 C: −0.119579E−01 D: 0.434175E−02 E: −0.559274E−03 F: 0.282816E−04 | | | | |
| 7: | 3.01200 | 1.020000 | 1.910822 | 35.2500 |
| 8: | −14.96500 | 0.327000 | | |
| ST: | INFINITY | 0.333000 | | |
| 10: | 3.29592 | 0.730000 | 1.544100 | 56.0927 |
| ASP: K: −12.517906 A: −0.507148E−01 B: −0.229461E+00 C: 0.450378E+00 D: −0.129911E+01 | | | | |
| 11: | −1.55570 | 0.065000 | | |
| ASP: K: 2.000466 A: −0.265738E+00 B: 0.370223E+00 C: −0.282547E+00 D: −0.114490E−02 | | | | |
| 12: | −1.21089 | 0.400000 | 1.651000 | 21.4850 |
| ASP: K: −2.614177 A: −0.670772E−01 B: 0.165401E+00 C: −0.311343E+00 D: 0.187176E+00 | | | | |
| 13: | 81.84529 | 0.050000 | | |
| ASP: K: −99.000000 A: 0.178997E+00 B: −0.141708E+00 C: 0.140917E+00 D: −0.116129E+00 E: 0.380629E−01 | | | | |
| 14: | 2.00057 | 0.734000 | 1.544100 | 56.0927 |
| ASP: K: −5.732764 A: 0.235128E−03 B: −0.330498E−01 C: 0.518012E−01 D: −0.288409E−01 E: 0.595630E−02 | | | | |
| 15: | 38.38343 | 0.065000 | | |
| ASP: K: 59.298598 A: −0.178106E+00 B: 0.208532E+00 C: −0.244667E+00 D: 0.168722E+00 E: −0.380127E−01 | | | | |
| 16: | 1.89146 | 0.441000 | 1.534800 | 55.7080 |
| ASP: K: −13.247536 A: −0.183585E+00 B: −0.273273E−01 C: −0.259858E−01 D: 0.107227E+00 E: −0.515822E−01 F: 0.725623E−02 | | | | |

TABLE 6-continued

| Lens Surfaces | R(mm) | Dn(mm) | Nd | Vd |
|---|---|---|---|---|
| 17: | 1.92781 | 0.680316 | | |

ASP:
K: −8.742334
A: −0.568642E−01  B: −0.106108E+00  C: 0.115473E+00
D: −0.501717E−01  E: 0.107605E−01  F: −0.103947E−02

| | | | | |
|---|---|---|---|---|
| 18: | INFINITY | 0.110000 | 1.516798 | 64.1983 |
| 19: | INFINITY | 0.352134 | | |
| IMG: | INFINITY | | | |

Figure 12:
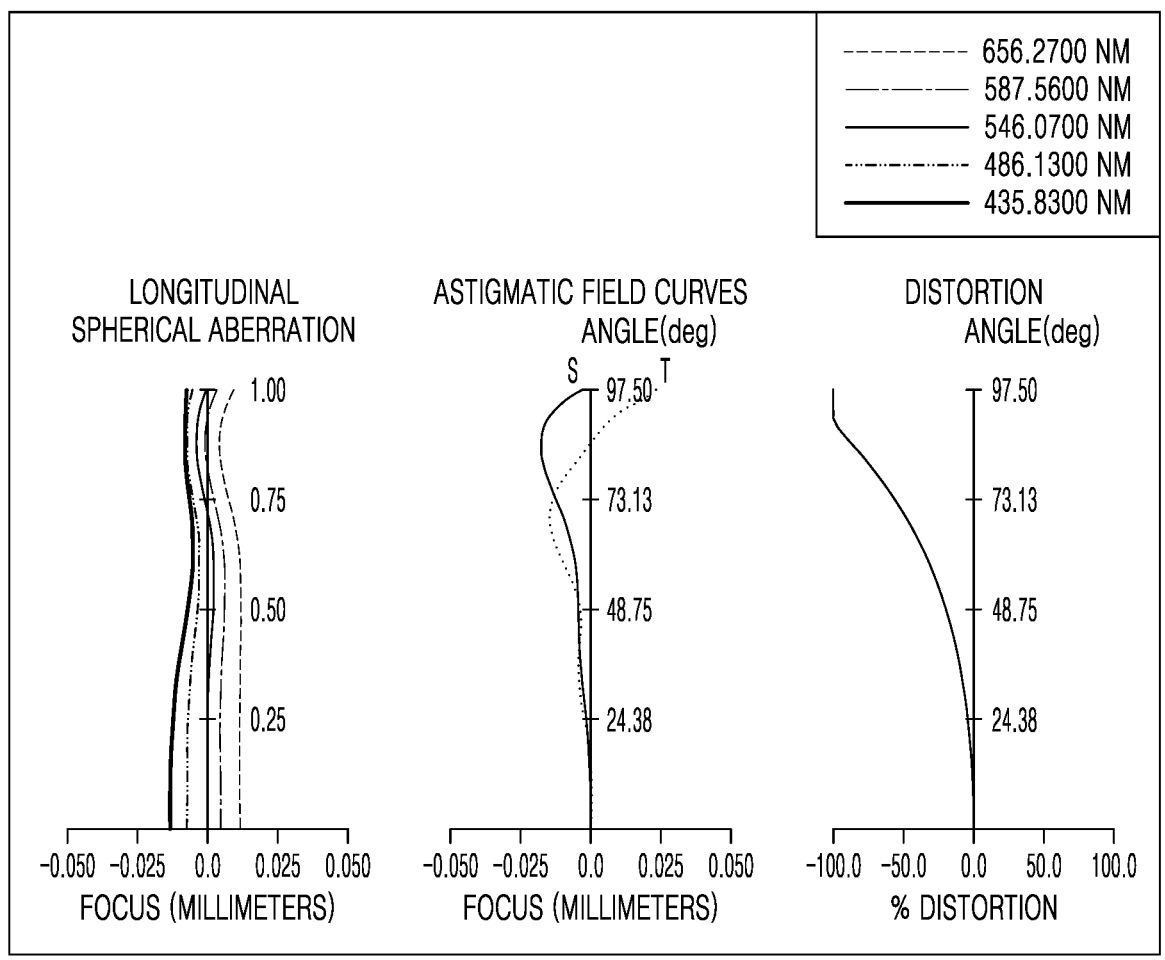
FIG. 12 illustrates aberration diagrams of the optical lens assembly of the sixth numerical embodiment according to various embodiments.

FIG. 12 illustrates longitudinal spherical aberration, astigmatic field curves, and distortion of the optical lens assembly 100-6 of the sixth numerical embodiment.

Seventh Numerical Embodiment

FIG. 13 illustrates the optical lens assembly 100-7 of the seventh numerical embodiment according to various embodiments, and, for example, Table 7 shows design data of the seventh numerical embodiment.
f: 1.02 mm FNO: 2.08 2ω: 195.00

TABLE 7

| Lens Surfaces | R(mm) | Dn(mm) | Nd | Vd |
|---|---|---|---|---|
| 1 | 20.000 | 2.25 | 1.51680 | 64.2 |
| 2 | 15.000 | 2.25 | | |
| 3 | 12.185 | 1.00 | 1.77250 | 49.6 |
| 4 | 2.896 | 1.92 | | |
| 5* | −97.558 | 1.00 | 1.54410 | 56.1 |

ASP
K: −5.960784
A: 1.249599e−002  B: −5.952794e−003  C: 1.086199e−003
D: −1.221866e−004  E: 7.985729E−06  F: −2.146790E−07

| 6* | 1.877 | 1.33 | | |
|---|---|---|---|---|

ASP
K: −1.035341
A: 1.308319e−002  B: −3.133746e−003  C: −1.020466e−002
D: 5.187253e−003  E: −1.065150E−03  F: 8.692665E−05

| 7* | 4.258 | 1.32 | 1.82943 | 37.0 |
|---|---|---|---|---|

ASP
K: −4.367624
A: −2.293821e−003  B: −1.655341e−003  C: 8.465282e−004
D: −1.513399e−004  E: 9.056090E−06

| 8* | −5.483 | 0.62 | | |
|---|---|---|---|---|

ASP
K: −4.055733
A: 5.462141e−003  B: 7.203220e−004  C: −7.252394e−004
D: −3.271813e−005

| ST | Infinity | 0.05 | | |
|---|---|---|---|---|
| 10* | 3.193 | 0.79 | 1.54410 | 56.1 |

ASP
K: −6.123601
A: −1.461753e−002  B: −3.222554e−001  C: 8.933616e−001
D: −2.103439e+000

| 11* | −1.540 | 0.05 | | |
|---|---|---|---|---|

ASP
K: 1.832059
A: −3.741947e−001  B: 8.028174e−001  C: −1.466917e+000
D: 1.323842e+000  E: −4.837835E−01

TABLE 7-continued

| Lens Surfaces | R(mm) | Dn(mm) | Nd | Vd |
|---|---|---|---|---|
| 12* | −1.554 | 0.40 | 1.65100 | 21.5 |

ASP
K: −1.046872
A: −2.109846e−001  B: 7.776746e−001  C: −1.679265e+000
D: 1.261920e+000

| 13* | 10.213 | 0.05 | | |
|---|---|---|---|---|

ASP
K: 98.546743
A: 4.634829e−002  B: 2.205788e−001  C: −4.205415e−001
D: 3.212317e−001  E: −1.034005E−01

| 14* | 2.983 | 0.79 | 1.54410 | 56.1 |
|---|---|---|---|---|

ASP
K: −9.931645
A: 1.187069e−002  B: −6.440328e−002  C: 8.357000e−002
D: −2.907811e−002  E: 3.051794E−03

| 15* | −3.111 | 0.05 | | |
|---|---|---|---|---|

ASP
K: −49.997029
A: −2.949338e−001  B: 4.122908e−001  C: −5.110362e−001
D: 3.681136e−001  E: −1.096749E−01  F: 1.052823E−02

| 16* | 1.498 | 0.41 | 1.65100 | 21.5 |
|---|---|---|---|---|

ASP
K: −6.899504
A: −2.300065e−001  B: −5.936136e−003  C: 5.990223e−002
D: −7.279700e−002  E: 8.372566E−02  F: −4.170945E−02
G: 6.282552E−03

| 17* | 1.151 | 0.62 | | |
|---|---|---|---|---|

ASP
K: −1.636345
A: −3.409811e−001  B: 1.801833e−001  C: −5.984591e−002
D: 5.159937e−003  E: 5.985694E−03  F: −2.782619E−03
G: 3.498085E−04

| 18 | Infinity | 0.11 | 1.51680 | 64.2 |
|---|---|---|---|---|
| 19 | Infinity | 0.35 | | |
| IMG | | | | |

Figure 14:
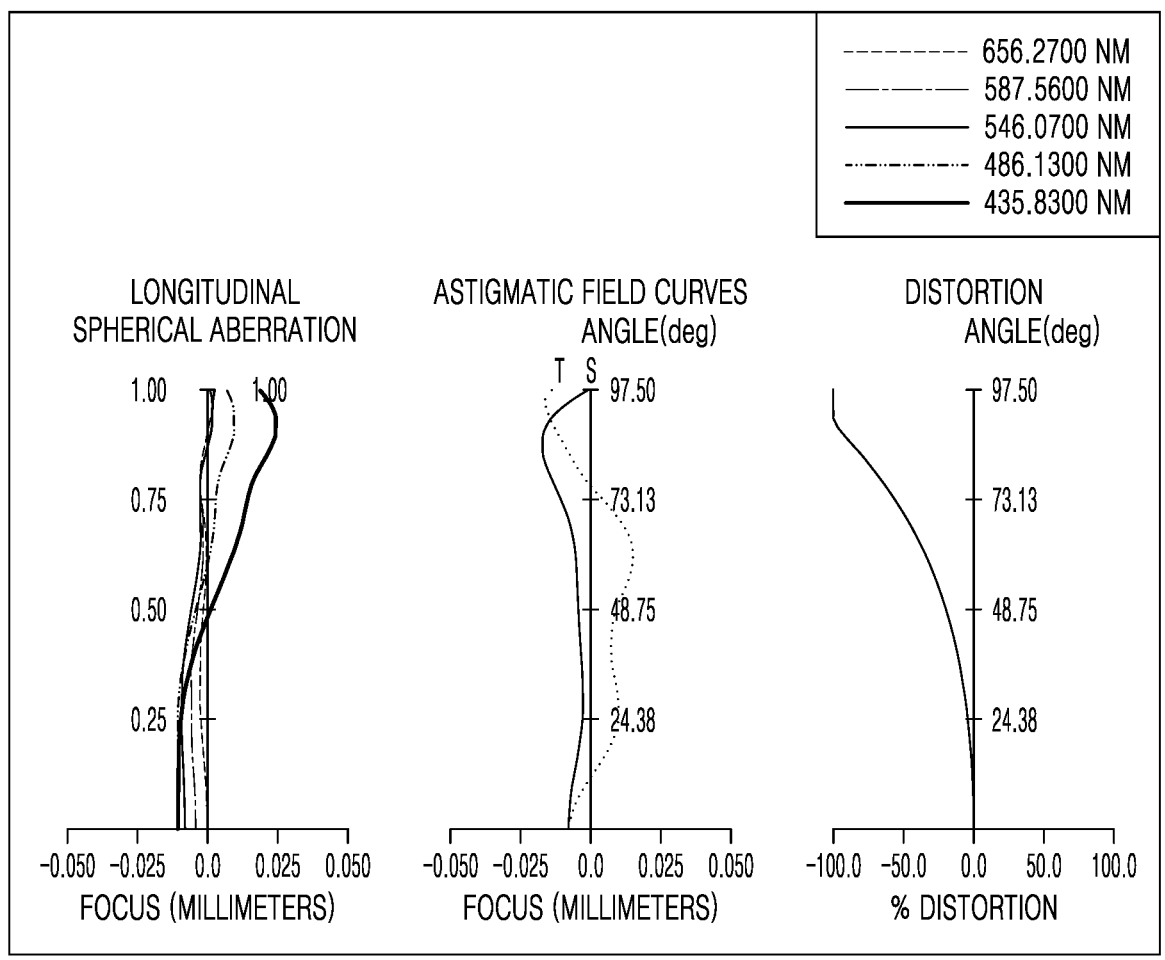
FIG. 14 illustrates aberration diagrams of the optical lens assembly of the seventh numerical embodiment according to various embodiments.

FIG. 14 illustrates longitudinal spherical aberration, astigmatic field curves, and distortion of the optical lens assembly 100-7 of the seventh numerical embodiment.

Eighth Numerical Embodiment

FIG. 15 illustrates the optical lens assembly 100-8 of the eighth numerical embodiment according to various embodiments, and, for example, Table 8 shows design data of the eighth numerical embodiment.
f: 0.97 mm FNO: 2.08 2ω: 195.00

TABLE 8

| Lens Surfaces | R(mm) | Dn(mm) | Nd | Vd |
|---|---|---|---|---|
| 1 | 12.406 | 1.20 | 1.51680 | 64.2 |
| 2 | 3.155 | 1.87 | | |
| 3* | 500.000 | 0.55 | 1.68946 | 52.7 |

TABLE 8-continued

| Lens Surfaces | R(mm) | Dn(mm) | Nd | Vd |
|---|---|---|---|---|
| ASP | | | | |
| K: −50.000000 | | | | |
| A: 2.354156e−002 B: −8.688458e−003 C: 1.518682e−003 | | | | |
| D: −1.477516e−004 E: 7.627254E−06 F: −1.618790E−07 | | | | |
| 4* | 1.555 | 1.41 | | |
| ASP | | | | |
| K: −0.718664 | | | | |
| A: −9.291956e−004 B: 3.264288e−002 C: −3.180591e−002 | | | | |
| D: 1.218681e−002 E: −2.135592E−03 F: 1.416321E−04 | | | | |
| 5* | 5.921 | 1.48 | 1.82943 | 37.0 |
| ASP | | | | |
| K: −7.090288 | | | | |
| A: −2.765559e−002 B: 4.254772e−003 C: 0.000000e+000 | | | | |
| D: 0.000000e+000 | | | | |
| 6* | −3.314 | 0.30 | | |
| ASP | | | | |
| K: −1.797228 | | | | |
| A: 3.079442e−003 B: −1.015506e−003 C: 0.000000e+000 D: 0.000000e+000 | | | | |
| ST | Infinity | 0.04 | | |
| 8* | 4.002 | 0.77 | 1.54410 | 56.1 |
| ASP | | | | |
| K: −6.622161 | | | | |
| A: −4.565041e−002 B: −3.072288e−001 C: 8.578687e−001 | | | | |
| D: −2.375742e+000 | | | | |
| 9* | −1.401 | 0.10 | | |
| ASP | | | | |
| K: 1.643386 | | | | |
| A: −5.247123e−001 B: 1.894773e+000 C: −3.426369e+000 | | | | |
| D: 2.226080e+000 | | | | |
| 10* | −1.407 | 0.40 | 1.65100 | 21.5 |
| ASP | | | | |
| K: −0.933139 | | | | |
| A: −5.503547e−001 B: 2.741931e+000 C: −5.372909e+000 | | | | |
| D: 3.528928e+000 | | | | |
| 11* | 10.150 | 0.05 | | |
| ASP | | | | |
| K: 98.782576 | | | | |
| A: −1.742088e−001 B: 8.380084e−001 C: −1.176658e+000 | | | | |
| D: 7.107960e−001 E: −1.762279E−01 | | | | |
| 12* | 2.134 | 0.80 | 1.54410 | 56.1 |
| ASP | | | | |
| K: −5.064939 | | | | |
| A: −1.028420e−002 B: −4.388381e−002 C: 9.351576e−002 | | | | |
| D: −5.649321e−002 E: 9.817178E−03 | | | | |
| 13* | −4.850 | 0.07 | | |
| ASP | | | | |
| K: −49.920795 | | | | |
| A: −8.899414e−002 B: 4.717652e−002 C: −1.651805e−001 | | | | |
| D: 1.656927e−001 E: −3.937151e−02 | | | | |
| 14* | 1.783 | 0.45 | 1.65100 | 21.5 |
| ASP | | | | |
| K: −22.254027 | | | | |
| A: −6.055870e−002 B: −4.885888e−001 C: 5.420577e−001 | | | | |
| D: −3.048819e−001 E: 1.185161E−01 F: −2.287530e−02 | | | | |
| 15* | 1.402 | 0.45 | | |
| ASP | | | | |
| K: −1.464766 | | | | |
| A: −2.738894e−001 B: 5.407609e−002 C: 4.489280e−002 | | | | |
| D: −3.859735e−002 E: 1.271113e−02 F: −1.697834E−03 | | | | |
| 16 | Infinity | 0.11 | 1.51680 | 64.2 |
| 17 | Infinity | 0.35 | | |
| IMG | | | | |

Figure 16:
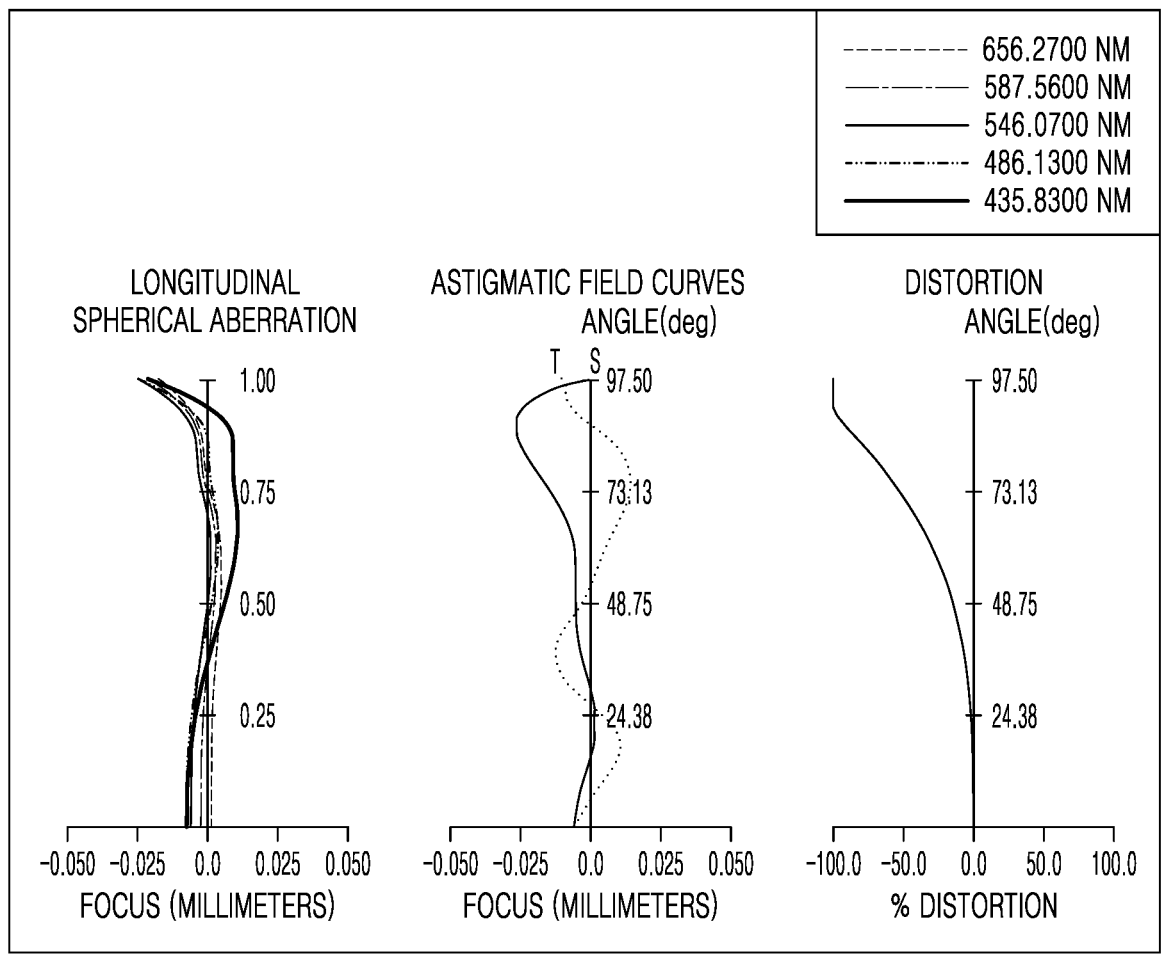
FIG. 16 illustrates aberration diagrams of the optical lens assembly of the eighth numerical embodiment according to various embodiments.

FIG. 16 illustrates longitudinal spherical aberration, astigmatic field curves, and distortion of the optical lens assembly 100-8 of the eighth numerical embodiment.

Ninth Numerical Embodiment

FIG. 17 illustrates the optical lens assembly 100-9 of the ninth numerical embodiment according to various embodiments, and, for example, Table 9 shows design data of the ninth numerical embodiment.

f: 1.04 mm FNO: 2.08 2ω: 195.00

TABLE 9

| Lens Surfaces | R(mm) | Dn(mm) | Nd | Vd |
|---|---|---|---|---|
| 1 | 11.335 | 1.00 | 1.72916 | 54.7 |
| 2 | 2.991 | 1.80 | | |
| 3* | 73.552 | 0.89 | 1.54410 | 56.1 |
| ASP | | | | |
| K: −50.000000 | | | | |
| A: 3.249369e−002 B: −1.263553e−002 C: 1.981376e−003 | | | | |
| D: −1.663552e−004 E: 7.430260E−06 F: −1.381872E−07 | | | | |
| 4* | 1.838 | 1.19 | | |
| ASP | | | | |
| K: −0.904473 | | | | |
| A: 5.997618e−002 B: −1.795088e−002 C: −9.265896e−003 | | | | |
| D: 5.141450e−003 E: −8.874027E−04 F: 5.267881E−05 | | | | |
| 5* | 13.946 | 1.10 | 1.82943 | 37.0 |
| ASP | | | | |
| K: −7.090288 | | | | |
| A: −9.977766e−003 B: 1.316325e−003 C: 0.000000e+000 | | | | |
| D: 0.000000e+000 | | | | |
| 6* | −3.873 | 0.59 | | |
| ASP | | | | |
| K: −2.256187 | | | | |
| A: 2.827595e−003 B: −2.297607e−004 C: 0.000000e+000 | | | | |
| D: 0.000000e+000 | | | | |
| ST | Infinity | 0.04 | | |
| 8* | 2.825 | 0.79 | 1.54410 | 56.1 |
| ASP | | | | |
| K: −6.622161 | | | | |
| A: −2.237520e−002 B: −3.224951e−001 C: 7.206160e−001 | | | | |
| D: −1.776174e+000 | | | | |
| 9* | −1.458 | 0.11 | | |
| ASP | | | | |
| K: 1.555284 | | | | |
| A: −2.907450e−001 B: 7.435095e−001 C: −1.124138e+000 | | | | |
| D: 5.715935e−001 | | | | |

TABLE 9-continued

| Lens Surfaces | R(mm) | Dn(mm) | Nd | Vd |
|---|---|---|---|---|
| 10* | −1.444 | 0.40 | 1.65100 | 21.5 |

ASP
K: −1.822471
A: −3.002840e−001 B: 1.236175e+000 C: −2.125112e+000
D: 1.313629e+000

| 11* | 10.455 | 0.05 | | |
|---|---|---|---|---|

ASP
K: 98.782576
A: −8.402233e−002 B: 4.097405e−001 C: −4.636090e−001
D: 2.164448e−001 E: −4.176504e−02

| 12* | 2.316 | 0.77 | 1.54410 | 56.1 |
|---|---|---|---|---|

ASP
K: −4.605857
A: −4.677306e−002 B: −1.409829e−005 C: 4.565580e−002
D: −2.528014e−002 E: 3.828829E−03

| 13* | −3.510 | 0.19 | | |
|---|---|---|---|---|

ASP
K: −49.920795
A: −2.487804e−001 B: 3.420216e−001 C: −3.816275e−001
D: 2.506305e−001 E: −5.483105E−02

| 14* | 1.564 | 0.45 | 1.65100 | 21.5 |
|---|---|---|---|---|

ASP
K: −10.000000
A: −1.850190e−001 B: −1.701399e−001 C: 1.842324e−001
D: −4.289218e−002 E: −3.574786E−04 F: 1.470332E−04

| 15* | 1.180 | 0.47 | | |
|---|---|---|---|---|

ASP
K: −2.214673
A: −2.782233e−001 B: 1.267887e−001 C: −3.885883e−002
D: 8.565027e−003 E: −8.996769E−04 F: −4.635731E−05

| 16 | Infinity | 0.11 | 1.51680 | 64.2 |
|---|---|---|---|---|
| 17 | Infinity | 0.35 | | |
| IMG | | | | |

Figure 18:
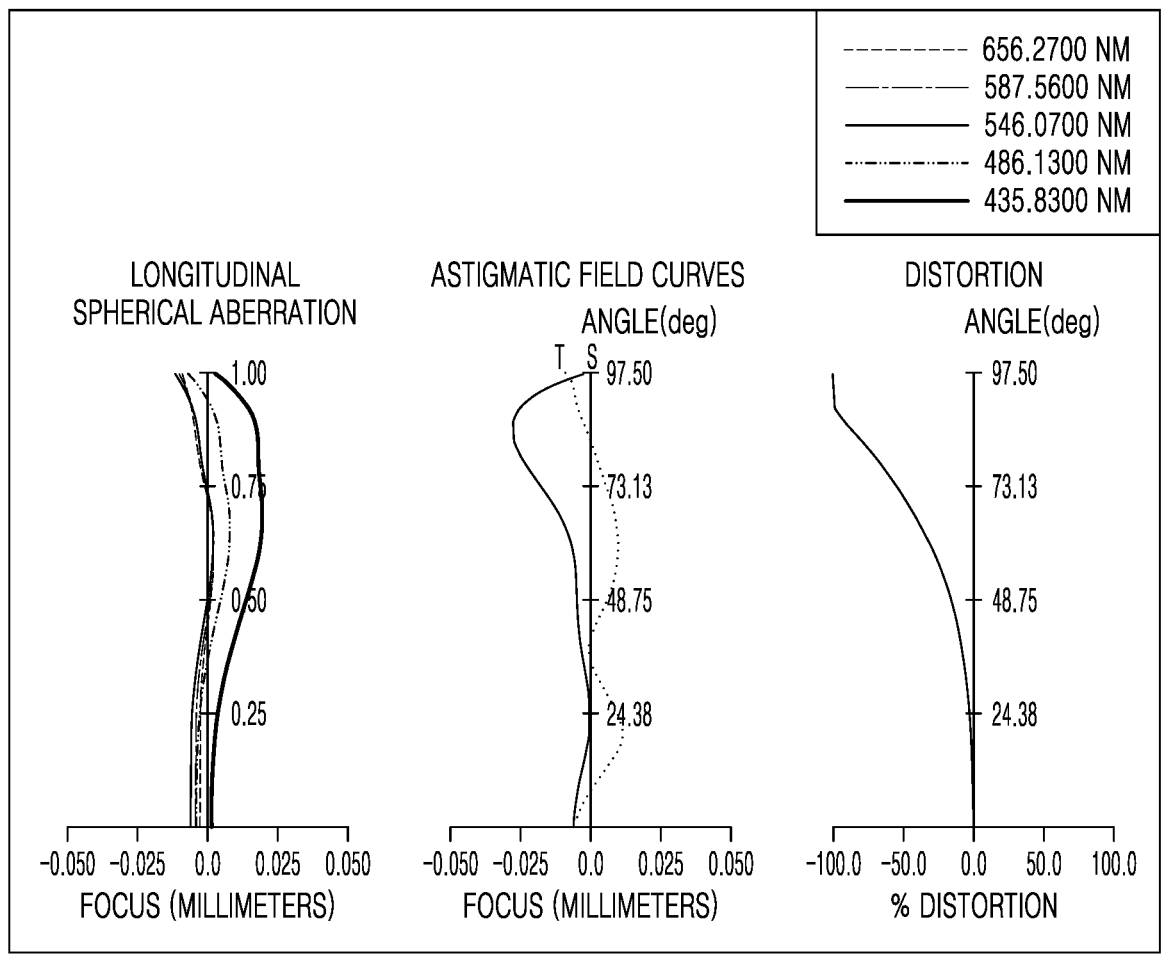
FIG. 18 illustrates aberration diagrams of the optical lens assembly of the ninth numerical embodiment according to various embodiments.

FIG. 18 illustrates longitudinal spherical aberration, astigmatic field curves, and distortion of the optical lens assembly 100-9 of the ninth numerical embodiment.

Tenth Numerical Embodiment

FIG. 19 illustrates the optical lens assembly 100-10 of the tenth numerical embodiment according to various embodiments, and, for example, Table 10 shows design data of the tenth numerical embodiment.

f: 1.09 mm FNO: 2.07 2ω: 195.00

TABLE 10

| Lens Surfaces | R(mm) | Dn(mm) | Nd | Vd |
|---|---|---|---|---|
| 1 | 11.987 | 1.00 | 1.77250 | 49.6 |
| 2 | 2.745 | 1.64 | | |
| 3* | 1970.282 | 0.84 | 1.54410 | 56.1 |

ASP
K: −50.000000
A: 2.951347e−002 B: −1.150135e−002 C: 2.018463e−003
D: −2.032016e−004 E: 1.139266E−05 F: −2.691840E−07

TABLE 10-continued

| Lens Surfaces | R(mm) | Dn(mm) | Nd | Vd |
|---|---|---|---|---|
| 4* | 1.859 | 0.99 | | |

ASP
K: −0.624728
A: 5.825933e−002 B: −1.636682e−002 C: −3.673477e−003
D: 2.602661e−003 E: −4.671832e−04 F: 2.723445E−05

| 5 | 6.418 | 1.10 | 2.00100 | 29.1 |
|---|---|---|---|---|
| 6 | −7.980 | 0.88 | | |
| ST | Infinity | 0.03 | | |
| 8* | 2.479 | 0.76 | 1.54410 | 56.1 |

ASP
K: −5.460625
A: −2.056850e−002 B: −2.167706e−001 C: 3.952621e−001
D: −1.152133e+000

| 9* | −1.578 | 0.10 | | |
|---|---|---|---|---|

ASP
K: 1.951794
A: −1.509679e−001 B: 2.884533e−001 C: −4.918149e−001
D: 2.467846e−001

| 10* | −1.578 | 0.40 | 1.65100 | 21.5 |
|---|---|---|---|---|

ASP
K: −1.938834
A: −1.201487e−001 B: 4.362950e−001 C: −8.544863e−001
D: 6.146768e−001

| 11* | 10.246 | 0.05 | | |
|---|---|---|---|---|

ASP
K: 93.482383
A: 2.465543e−002 B: 8.219350e−002 C: −1.545382e−001
D: 1.365558e−001 E: −5.494896E−02

| 12* | 2.719 | 0.71 | 1.54410 | 56.1 |
|---|---|---|---|---|

ASP
K: −3.835578
A: 6.593856e−003 B: −7.332548e−002 C: 7.567048e−002
D: −2.738198e−002 E: 3.327372E−03

| 13* | −4.618 | 0.21 | | |
|---|---|---|---|---|

ASP
K: −49.920797
A: −1.838192e−001 B: 2.592131e−001 C: −2.727883e−001
D: 1.677758e−001 E: −3.620044E−02

| 14* | 1.282 | 0.45 | 1.54410 | 56.1 |
|---|---|---|---|---|

ASP
K: −5.625431
A: −9.847732e−002 B: −7.758803e−002 C: 9.545902e−003
D: 4.784047e−002 E: −2.191998E−02 F: 2.616230E−03

| 15* | 1.175 | 0.59 | | |
|---|---|---|---|---|

ASP
K: −1.663361
A: −1.611846e−001 B: −7.322209e−003 C: 4.392431e−002
D: −2.326896e−002 E: 5.893865E−03 F: −6.331018E−04

| 16 | Infinity | 0.11 | 1.51680 | 64.2 |
|---|---|---|---|---|
| 17 | Infinity | 0.35 | | |
| IMG | | | | |

Figure 20:
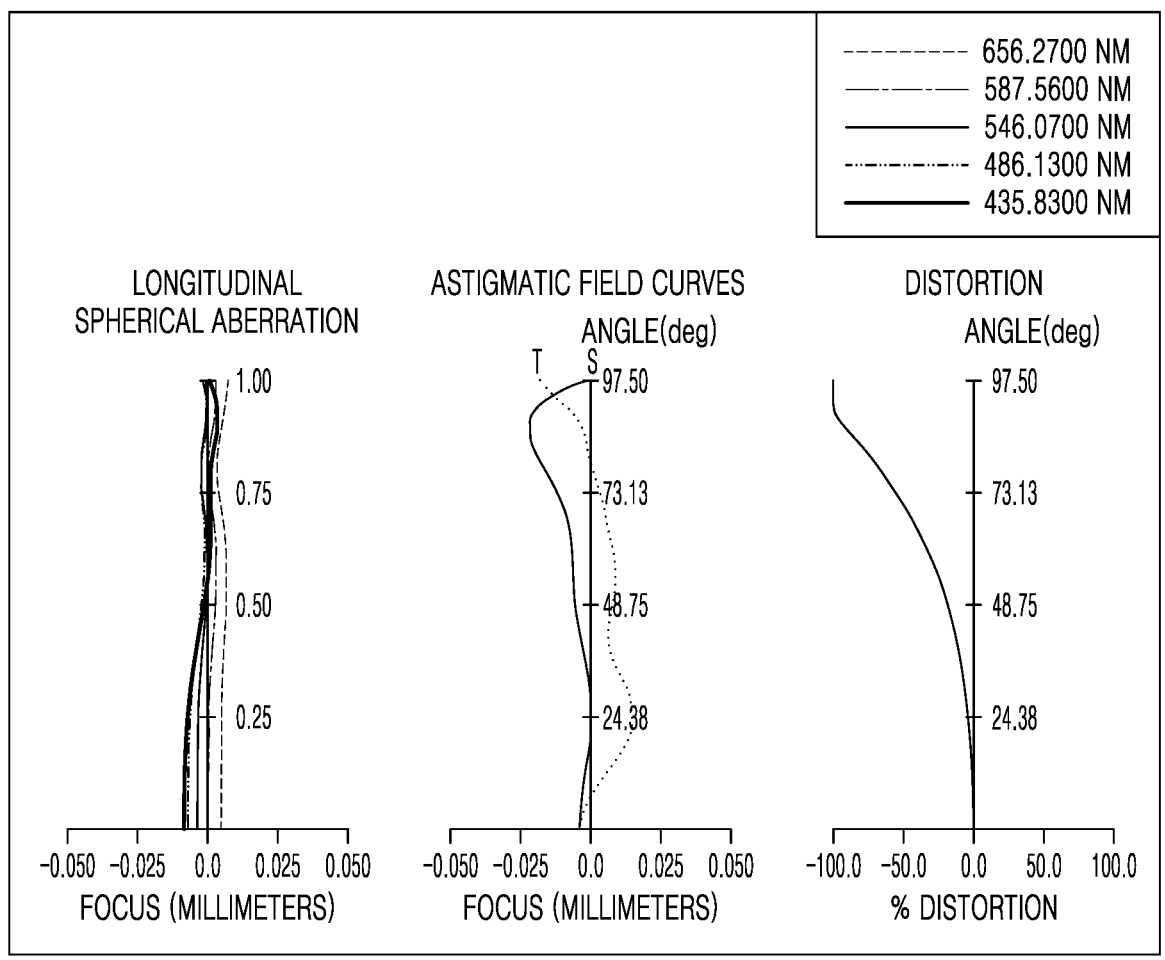
FIG. 20 illustrates aberration diagrams of the optical lens assembly of the tenth numerical embodiment according to various embodiments.

FIG. 20 illustrates longitudinal spherical aberration, astigmatic field curves, and distortion of the optical lens assembly 100-10 of the tenth numerical embodiment.

Table 11 shows that the optical lens assemblies of the various embodiments satisfy Conditions 1 to 11.

TABLE 11

| Conditions | Embodiments | | | | | | | | | |
|---|---|---|---|---|---|---|---|---|---|---|
| | EX1 | EX2 | EX3 | EX4 | EX5 | EX6 | EX7 | EX8 | EX9 | EX10 |
| 1 | 3.550 | 3.186 | 2.424 | 3.004 | 2.864 | 3.422 | 2.798 | 3.058 | 2.388 | 2.170 |
| 2 or 5 | 1.835 | 1.911 | 1.835 | 1.835 | 1.835 | 1.911 | 1.829 | 1.829 | 1.829 | 2.001 |
| 3 | 34.600 | 34.600 | 34.610 | 34.610 | 34.610 | 34.610 | 34.600 | 34.600 | 34.600 | 34.600 |
| 4 | 1.540 | 1.325 | 0.962 | 1.204 | 0.883 | 1.317 | 0.932 | 1.075 | 0.662 | 0.641 |
| 6 | 42.7218 | 35.2494 | 42.7218 | 42.7218 | 42.7218 | 35.2500 | 37.0 | 37.0 | 37.0 | 29.1 |
| 7 | 2.305 | 2.405 | 2.520 | 2.495 | 3.241 | 2.598 | 3.003 | 2.845 | 3.607 | 3.385 |
| 8 | N/A | N/A | N/A | N/A | N/A | N/A | 0.196 | 1.068 | 1.003 | N/A |
| 9 | N/A | N/A | N/A | N/A | N/A | N/A | 34.600 | 34.600 | 34.600 | N/A |
| 10 | N/A | N/A | N/A | N/A | N/A | N/A | 15.385 | 32.494 | 9.907 | N/A |
| 11 | N/A | N/A | N/A | N/A | N/A | N/A | 2.979 | 2.927 | 2.608 | N/A |

In Table 11 above, N/A refers to "not applicable." The optical lens assemblies of the various embodiments may be used in electronic apparatuses employing imaging devices. The optical lens assemblies of the embodiments may be applied to various electronic apparatuses such as digital cameras, interchangeable lens cameras, video cameras, cellular phone cameras, or cameras of small mobile devices.

Figure 21:
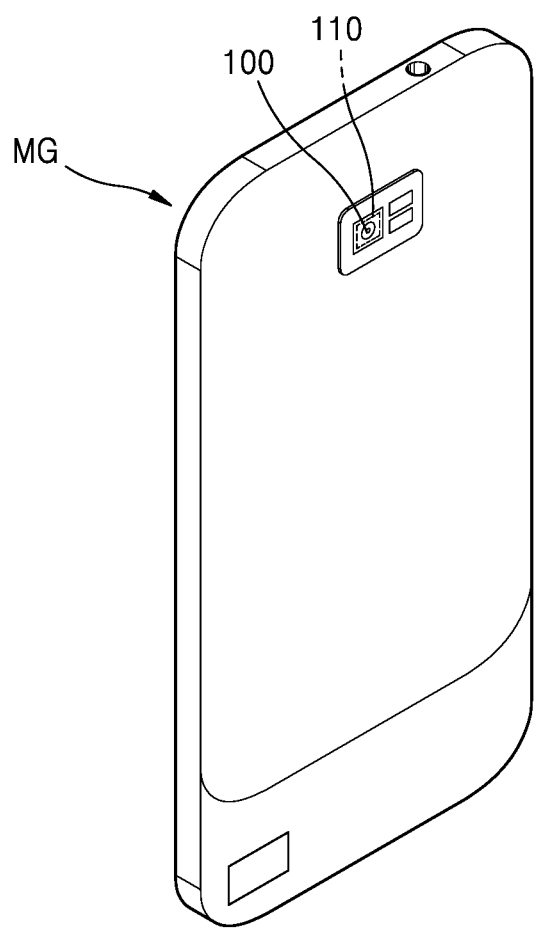
FIG. 21 illustrates an electronic apparatus including an optical lens assembly according to various embodiments.

FIG. 21 illustrates an electronic apparatus MG including an optical lens assembly 100 according to an embodiment. FIG. 21 illustrates a non-limiting example where the electronic apparatus MG is a mobile phone. The electronic apparatus MG may include: at least one optical lens assembly 100; and an image sensor 110 configured to receive images formed by the at least one optical lens assembly 100 and convert the images into electric image signals. The optical lens assembly 100 may be any one of the optical lens assemblies described with reference to FIGS. 1 to 20. If the optical lens assemblies of the various embodiments are used in photographing apparatuses such as small digital cameras or cameras of mobile phones, the photographing apparatuses may have high photographing performance.

In addition, since the optical lens assemblies of the various embodiments have small sizes, high performance, and large field of view of about 130° or greater, two, three, or N (where N is equal to or greater than 4) of the optical lens assemblies may be used as a photographing unit for obtaining high-resolution omnidirectional images.

Figure 22:
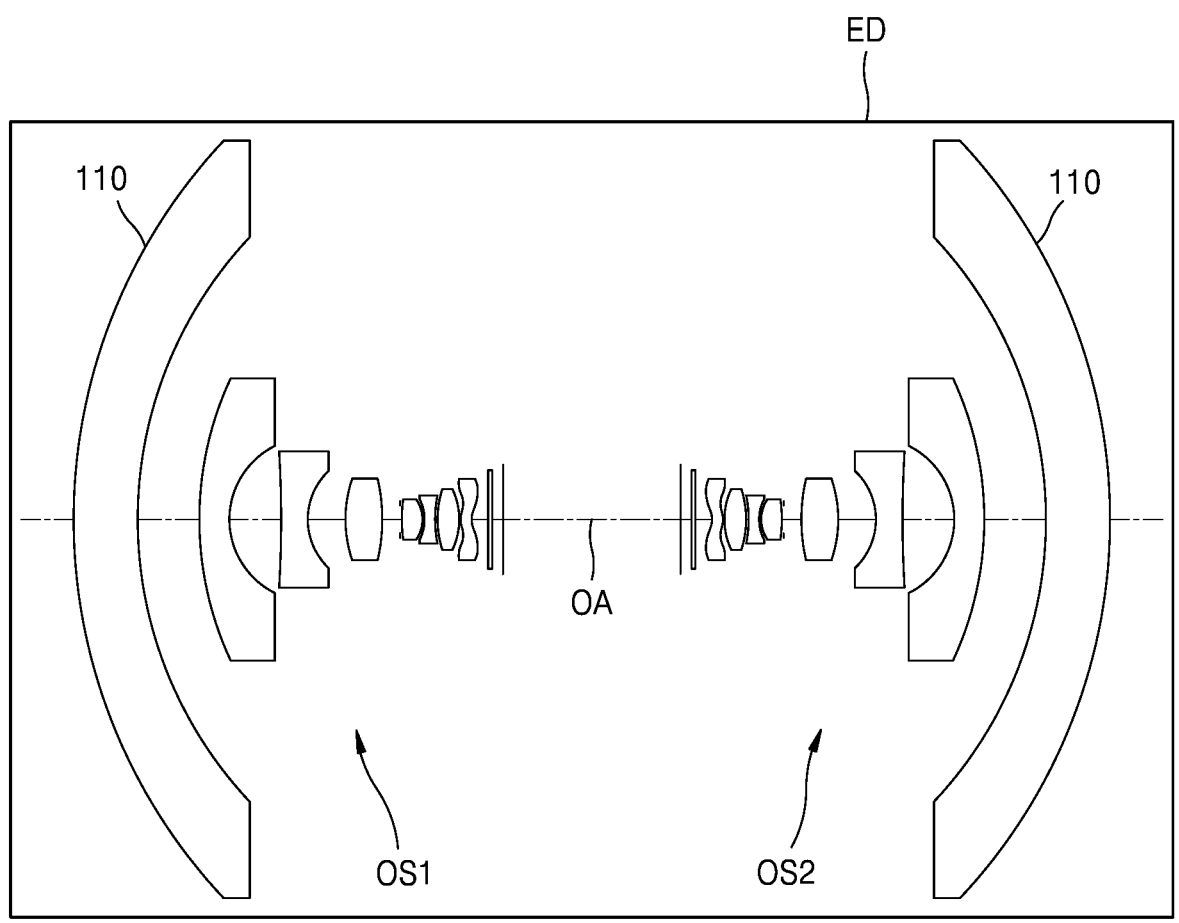
FIG. 22 illustrates an electronic apparatus including two optical lens assemblies according to various embodiments.

FIG. 22 illustrates another electronic apparatus ED including an optical lens assembly according to an embodiment. The electronic apparatus ED may include two or more of the optical lens assemblies of the various embodiments. For example, a first optical lens assembly OS1 and a second optical lens assembly OS2 may be arranged along a single optical axis OA. For example, the first optical lens assembly OS1 and the second optical lens assembly OS2 may be arranged in opposite directions in a straight line with images sensors 110 facing away each other. This arrangement enables photographing in all directions. However, the arrangement method is not limited thereto. That is, two of the optical lens assemblies of the embodiments or three or more of the optical lens assemblies of the embodiments may be arranged in various manners. Images captured using two or more of the optical lens assemblies may be stitched together to obtain omnidirectional images.

The electronic apparatuses of the embodiments may be applied to devices such as mobile devices, VR devices, AR devices, automotive surround view input devices, vision systems for unmanned transfer devices, automotive drive imaging devices, etc.

Figure 23:
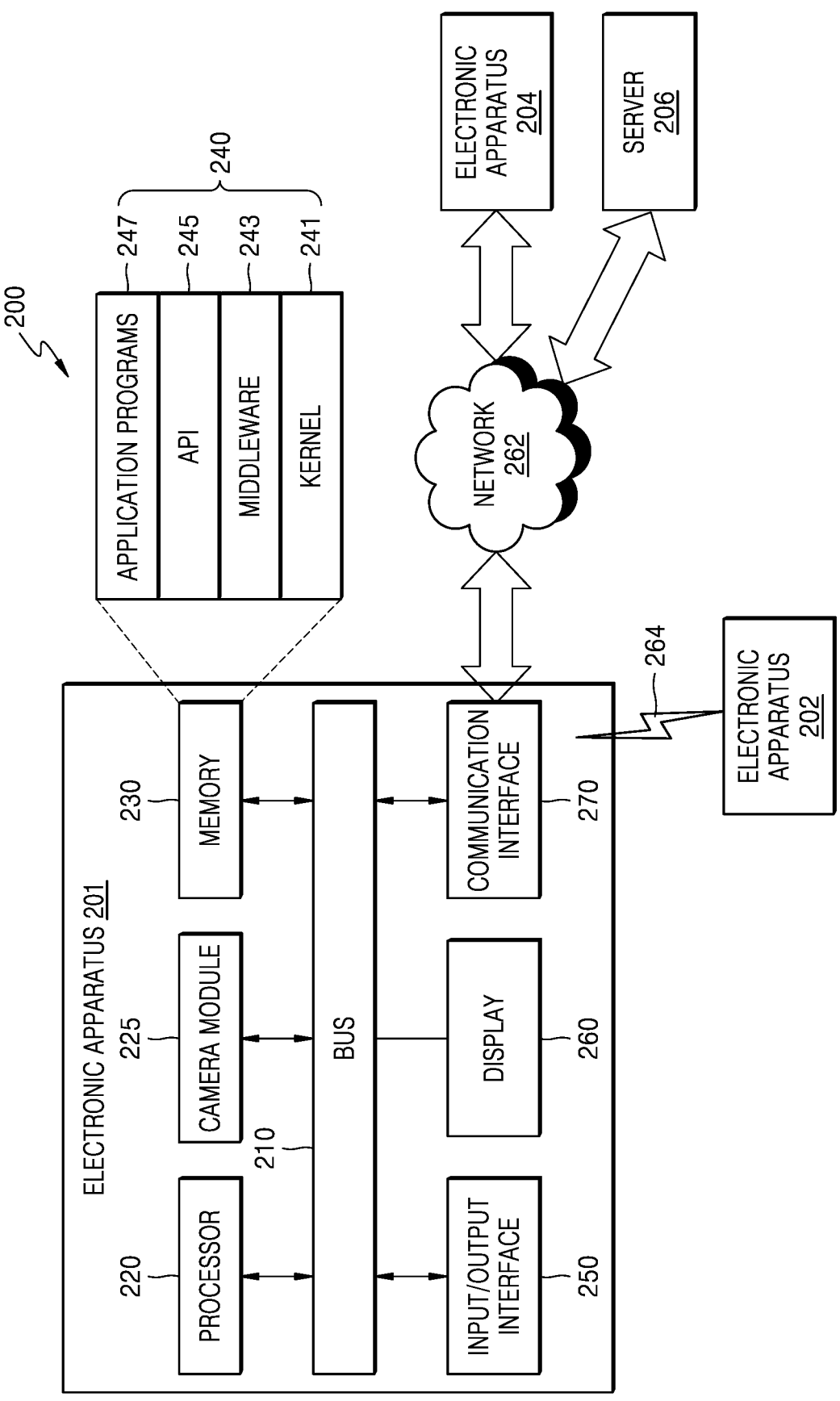
FIG. 23 illustrates a network environment system according to various embodiments.

FIG. 23 illustrates an electronic apparatus 201 in a network environment 200 according to various embodiments. The electronic apparatus 201 may include a bus 210, a processor 220, a camera module 225, a memory 230, an input/output interface 250, a display 260, and a communication interface 270. In some embodiments, at least one of the elements of the electronic apparatus 201 may be omitted, or the electronic apparatus 201 may include another element.

For example, the bus 210 may include a circuit configured to connect the elements 210 to 270 for communication therebetween (for example, transmission of control messages and/or data).

The processor 220 may include one or more of a central processing unit (CPU), an application processor (AP), and a communication processor (CP). For example, the processor 220 may perform calculation or data processing which relates to control and/or communication of at least one of the other elements of the electronic apparatus 201. The processor 220 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

For example, the camera module 225 may take still images and videos. According to an embodiment, the camera module 225 may include at least one image sensor (for example, a front image sensor or a rear image sensor), a lens, an image signal processor (ISP), or a flash (for example, a light-emitting diode (LED) or a xenon lamp). For example, the camera module 225 may include any one of the optical lens assemblies of the various embodiments.

The memory 230 may include a volatile memory and/or a nonvolatile memory. For example, the memory 230 may store instructions or data relating to at least one of the other elements of the electronic apparatus 201. According to an embodiment, the memory 230 may include software and/or a program 240. For example, the program 240 may include a kernel 241, middleware 243, an application programming interface (API) 245, and/or application programs (or applications) 247. At least a part of the kernel 241, the middleware 243, or the API 245 may function as an operating system (OS).

For example, the kernel 241 may control or manage system resources (such as the bus 210, the processor 220, or the memory 230) used to execute operations or functions of the other programs (such as the middleware 243, the API 245, or the application programs 247). In addition, the kernel 241 may provide an interface allowing the middleware 243, the API 245, or the application programs 247 to access individual elements of the electronic apparatus 201, thereby making it possible to control or manage system resources.

For example, the middleware 243 may function as an intermediary so that the API 245 or the application programs 247 may communicate with the kernel 241 for transmission of data therebetween.

In addition, the middleware 243 may process one or more operation requests from the application programs 247 in the order of priority. For example, the middleware 243 may give priority to at least one of the application programs 247 such that the at least one of the application programs 247 may use system resources (such as the bus 210, the processor 220, or the memory 230) of the electronic apparatus 201. For example, the middleware 243 may process the one or more operation requests from the application programs 247 according to the priority given to at least one of the application programs 247. In this manner, the middleware 243 may perform a scheduling or load-balancing operation relating to the one or more operation requests.

For example, the API 245 may be an interface through which the application programs 247 control functions provided by the kernel 241 or the middleware 243. For example, the API 245 may include at least one interface or function (for example, a command) for file control, window control, image processing, or text control.

For example, the input/output interface 250 may function as an interface for transmitting instructions or data input from a user or another external device to one or more of the other elements of the electronic apparatus 201. In addition, the input/output interface 250 may transmit instructions or data received from one or more of the other elements of the electronic apparatus 201 to a user or another external device.

For example, the display 260 may include a liquid crystal display (LCD), an LED display, an organic light-emitting diode (OLED) display, a microelectromechanical system (MEMS) display, or an electronic paper display. For example, the display 260 may display content (such as texts, images, videos, icons, or symbols) for users. The display 260 may include a touch screen. For example, the display 260 may receive an input through a touch, a gesture, an approaching action, or a hovering action by an electronic pen or a user's body part.

For example, the communication interface 270 may enable communication between the electronic apparatus 201 and an external device (for example, a first external electronic apparatus 202, a second external electronic apparatus 204, or a server 206). For example, the communication interface 270 may communicate with external devices (for example, the second external electronic apparatus 204 or the server 206) connected to a network 262 by a wireless communication method or a wired communication method.

For example, the wireless communication method may use a cellular protocol. For example, the wireless communication method may use at least one of long-term evolution (LTE), LTE advance (LTE-A), code division multiple access (CDMA), wideband CDMA (WCDMA), universal mobile telecommunications system (UMTS), wireless broadband (WiBro), or global system for mobile communication (GSM). In addition, the wireless communication method may include short-range communication 264. For example, the short-range communication 264 may include at least one of wireless fidelity (WiFi), Bluetooth, near field communication (NFC), or global navigation satellite system (GNSS). For example, according to regions or bandwidths, GNSS may include at least one of global positioning system (GPS), global navigation satellite system (Glonass), Beidou navigation satellite system (hereinafter, referred to as Beidou), or the European global satellite-based navigation system (Galileo). In the present disclosure, "GPS" and "GNSS" may be interchangeably used. For example, the wired communication method may use at least one of universal serial bus (USB), high definition multimedia interface (HDMI), recommended standard-232 (RS-232), or plain old telephone service (POTS). For example, the network 262 may include at least one of a telecommunications network, a computer network (such as a local area network (LAN) or a wide area network (WAN)), the Internet, or a telephone network.

Each of the first external electronic apparatus 202 and the second external electronic apparatus 204 may be the same as or different from the electronic apparatus 201. According to an embodiment, the server 206 may include a group of one or more servers. According to an embodiment, all or some of operations of the electronic apparatus 201 may be performed by one or more other electronic apparatuses (such as the first and second external electronic apparatuses 202 and 204) or the server 206. According to an embodiment, when the electronic apparatus 201 has to perform a function or service by request or automation, instead of or in addition to performing the function or service by itself, the electronic apparatus 201 may request the server 206 or other devices (such as the first external electronic apparatus 202 or the second external electronic apparatus 204) to perform at least a part of the function or service. The server 206 or other devices (such as the first external electronic apparatus 202 or the second external electronic apparatus 204) may perform the at least part of the function or service in response to the request and may send results thereof to the electronic apparatus 201. The electronic apparatus 201 may use the received results or may process the received results so as to implement the function or service. To this end, for example, cloud computing, distributed computing, or client-server computing technology may be used.

Figure 24:
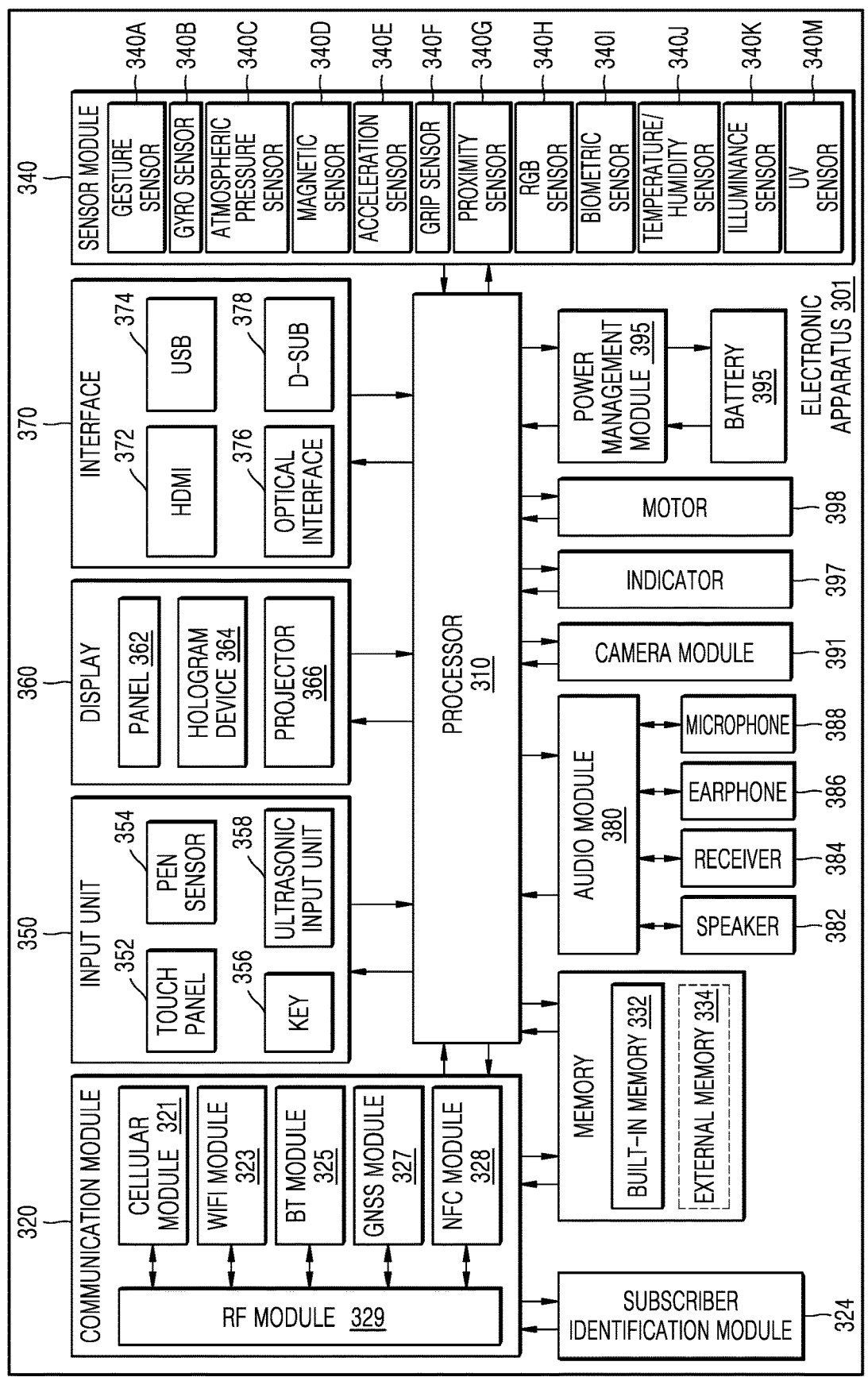
FIG. 24 illustrates a block diagram illustrating an electronic apparatus according to various embodiments.

FIG. 24 is a block diagram illustrating an electronic apparatus 301 according to various embodiments. The electronic apparatus 301 may entirely or partially include the electronic apparatus 201 illustrated in FIG. 23. The electronic apparatus 301 may include at least one processor 310 (such as an AP), a communication module 320, a subscriber identification module 324, a memory 330, a sensor module 340, an input unit 350, a display 360, an interface 370, an audio module 380, a camera module 391, a power management module 395, a battery 396, an indicator 397, and a motor 398.

For example, the processor 210 may control many pieces of hardware or software connected to the processor 210 by executing an operating system or an application program, and may perform data processing and calculations. For example, the processor 210 may be implemented as a system on chip (SoC). According to an embodiment, the processor 210 may include a graphics processing unit (GPU) and/or image signal processor. The processor 310 may include at least one element illustrated in FIG. 24 (for example, a cellular module 321). The processor 210 may load instructions or data transmitted from at least one of the other elements (such as a nonvolatile memory) on a volatile memory and may process the instructions or data, and may store various data on the nonvolatile memory.

The structure of the communication module 320 may be the same as or similar to the structure of the communication interface 270 illustrated in FIG. 23. For example, the communication module 320 may include the cellular module 321, a WiFi module 323, a Bluetooth module 325, a GNSS module 327 (such as a GPS module, a Glonass module, a Beidou module, or a Galileo module), an NFC module 328, and a radio frequency (RF) module 329.

For example, the cellular module 321 may provide services such as voice calling, video calling, text messaging, or Internet connection by using a communication network. According to an embodiment, the cellular module 321 may identify and authenticate the electronic apparatus 301 in a communication network by using the subscriber identification module 324 (for example, a subscriber identification module (SIM) card). According to an embodiment, the cellular module 321 may perform at least one of functions that the processor 210 may provide. According to an embodiment, the cellular module 321 may include a CP.

For example, each of the WiFi module 323, the Bluetooth module 325, the GNSS module 327, and the NFC module 328 may include a processor to process received data or data to be transmitted. In some embodiments, at least one of (for example, two of) the cellular module 321, the WiFi module 323, the Bluetooth module 325, the GNSS module 327, or the NFC module 328 may be included in an integrated chip (IC) or an IC package.

For example, the RF module 329 may transmit and receive communication signals (for example, RF signals). For example, the RF module 329 may include a transceiver, a power amp module (PAM), a frequency filter, a low noise amplifier (LNA), or an antenna. In other embodiments, at least one of the cellular module 321, the WiFi module 323, the Bluetooth module 325, the GNSS module 327, or the NFC module 328 may transmit and receive RF signals using a separate RF module.

For example, the subscriber identifier module 324 may include a SIM card or an embedded SIM. The subscriber identification module 324 may include unique identification information (such as an integrated circuit card identifier (ICCID)) or subscriber information (such as an international mobile subscriber identity (IMSI)).

For example, the memory 330 may include a built-in memory 332 or an external memory 334. For example, the built-in memory 332 may include at least one of a volatile memory such as a dynamic random access memory (DRAM), static random access memory (SRAM), or synchronous dynamic random access memory (SDRAM); or a nonvolatile memory such as one time programmable read only memory (OTPROM), programmable read only memory (PROM), erasable and programmable read only memory (EPROM), electrically erasable and programmable read only memory (EEPROM), mask read only memory (ROM), flash ROM, a flash memory (for example, a NAND flash memory or a NOR flash memory), a hard disk drive, or a solid state drive (SSD).

The external memory 334 may include a flash drive and may further include, for example, a compact flash (CD) card, a secure digital (SD) card, a micro secure digital (Micro-SD) card, a mini secure digital (Mini-SD) card, an extreme digital (xD) card, a multi-media card (MMC), or a memory stick. The external memory 334 may be operatively and/or physically connected to the electronic apparatus 301 through various interfaces.

For example, the sensor module 340 may measure physical quantities or detect operational states of the electronic apparatus 301, and may convert measured or detected information into electric signals. For example, the sensor module 340 may include at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (such as a red-green-blue (RGB) sensor), a biometric sensor 340I, a temperature/humidity sensor 340J, an illuminance sensor 340K, or an ultraviolet (UV) sensor 340M. Additionally or alternatively, the sensor module 340 may, for example, include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit configured to control at least one sensor of the sensor module 340. In some embodiments, the electronic apparatus 301 may further include a processor as a part of or independently of the processor 210 so as to control the sensor module 340. When the processor 210 is in a sleep mode, the processor may control the sensor module 340.

For example, the input unit 350 may include a touch panel 352, a (digital) pen sensor 354, a key 356, or an ultrasonic input unit 358. For example, the touch panel 352 may use at least one of a capacitive method, a resistive method, an infrared method, or an ultrasonic method. In addition, the touch panel 352 may further include a control circuit. The touch panel 352 may further include a tactile layer to provide a tactile sense to a user.

For example, the (digital) pen sensor 354 may be a part of the touch panel 352 or may include a separate sensing sheet. For example, the key 356 may include a physical button, an optical key, or a keypad. The ultrasonic input unit 358 may detect ultrasonic waves generated from an input tool by using a microphone (such as a microphone 388) and may check data corresponding to the ultrasonic waves.

The display 360 may include a panel 362, a hologram device 364, or a projector 366. The structure of the panel 362 may be the same as or similar to the structure of the display 260 illustrated in FIG. 23. For example, the panel 362 may be flexible, transparent, or wearable. The panel 362 and the touch panel 352 may be provided as a single module. According to an embodiment, the panel 362 may include a pressure sensor (or a force sensor) capable of sensing the magnitude of touching pressure by a user. The pressure sensor may be provided as part of the touch panel 352, or at least one pressure sensor may be provided separately from the touch panel 352. The hologram device 364 may display three-dimensional images in a space by using interference of light. The projector 366 may display images by projecting light onto a screen. For example, the screen may be located inside or outside the electronic apparatus 301. According to an embodiment, the display 360 may further include a control circuit to control the panel 362, the hologram device 364, or the projector 366.

For example, the interface 370 may include an HDMI 372, a USB 374, an optical interface 376, or a D-subminiature (D-sub) 378. For example, the interface 370 may include the communication interface 270 illustrated in FIG. 23. Additionally or alternatively, the interface 370 may, for example, include a mobile high-definition link (MI-IL) interface, a SD card/MMC interface, or an infrared data association (IrDA) interface.

For example, the audio module 280 may convert sounds into electric signals, and electric signals into sounds. For example, at least one element of the audio module 380 may include the input/output interface 250 illustrated in FIG. 23. For example, the audio module 280 may process sound information that is input through or will be output through a speaker 382, a receiver 384, an earphone 386, or the microphone 388.

For example, the camera module 391 may take still images and videos. According to an embodiment, the camera module 391 may include at least one image sensor (for example, a front image sensor or a rear image sensor), a lens, an ISP, or a flash (for example, an LED or a xenon lamp). For example, the camera module 391 may include any one of the optical lens assemblies of the various embodiments.

For example, the power management module 395 may manage power of the electronic apparatus 301. The electronic apparatus 301 may receive power from the battery 396. However, the electronic apparatus 301 is not limited to receiving power from the battery 396. According to an embodiment, the power management module 395 may include a power management integrated circuit (PMIC), a charger integrated circuit (IC), or a battery or fuel gauge. The PMIC may use a wired and/or wireless charging method. For example, the wireless charging method may include a magnetic resonance method, a magnetic induction method, or an electromagnetic wave method, and an additional wireless charging circuit such as a coil loop, a resonance circuit, or a rectifier may be used. For example, the battery or fuel gauge may measure the amount of electricity remaining in the battery 396 and the voltage, current, or temperature of the battery 396 during a charging operation. For example, the battery 396 may include a rechargeable battery and/or a solar battery.

The indicator 397 may display a particular state such as a booting state, a messaging state, or a charge state of the electronic apparatus 301 or a part of the electronic apparatus 301 (such as the processor 210). The motor 398 may convert an electric signal into a mechanical vibration and may produce a vibrational or haptic effect. The electronic apparatus 301 may include a processing device (such as a GPU) to support a mobile TV service. The processing unit for a mobile TV service may process media data according to a standard such as digital multimedia broadcasting (DMB), digital video broadcasting (DVB), or MediaFlo™.

According to various embodiments, an optical lens assembly may include a first lens group having positive refractive power, a stop, and a second lens group having positive refractive power that are arranged from an object side to an image side, wherein the first lens group may include a first lens having negative refractive power and a meniscus shape convex toward the object side, a second lens having negative refractive power, and at least one other lens, wherein the second lens group may include at least three lenses, and a lens of the second lens group closest to the image side may have an object-side surface convex toward the object side in a region near an optical axis and concave toward the object side in a peripheral region of the lens.

For example, all of the lenses of the second lens group may be aspheric plastic lenses.

For example, the optical lens assembly may satisfy the following condition.

$1.5 \leq f_2/f \leq 5.5$ <Condition> where $f_2$ denotes the focal length of the second lens group, and f denotes the focal length of the optical lens assembly.

For example, the optical lens assembly may have a field of view of about 130° or greater.

For example, the optical lens assembly may satisfy the following condition.

$25 \leq (V_{21}) - (V_{22}) \leq 40$ <Condition>

Where $V_{21}$ denotes the Abbe number of the first lens of the second lens group from the object side, and $V_{22}$ denotes the Abbe number of the second lens of the second lens group from the object side.

For example, the first lens group may include at least one positive lens and may satisfy the following condition.

$0.6 < f_2/f_{1p} < 1.6$ <Condition> where $f_2$ denotes the focal length of the second lens group, and $f_{1p}$ denotes the focal length of the first positive lens of the first lens group from the object side.

For example, the first lens group may include at least one positive lens, and the first positive lens of the first lens group from the object side may have a refractive index of about 1.73 to about 1.85.

For example, the first lens group may include at least one positive lens, and the first positive lens of the first lens group from the object side may have an Abbe number of about 29 to about 55.

For example, the first lens group may include at least one positive lens and may satisfy the following condition.

$2.0 < f_{1p}/f < 4.0$ <Condition> where $f_{1p}$ denotes the focal length of the first positive lens of the first lens group from the object side, and f denotes the focal length of the optical lens assembly.

For example, the first lens group may include at least one positive lens, and the first positive lens of the first lens group from the object side may have an aspheric object-side surface and may satisfy the following condition.

$0 < (RA_{1p\_bestfit} - RA_{1p})/RA_{1p} < 1.5$ <Condition> where $RA_{1p\_bestfit}$ denotes the best fit radius of curvature of the object-side surface of the first positive lens of the first lens group, and $RA_{1p}$ denotes the radius of curvature of the object-side surface of the first positive lens of the first lens group.

For example, the second lens group may include: a first aspheric plastic lens having positive refractive power, a second aspheric plastic lens having negative refractive power, and a third aspheric plastic lens having positive refractive power that are sequentially arranged from the object side to the lens of the second lens group closest to the image side, and wherein the lens of the second lens group closest to the image side is an aspheric plastic lens having negative refractive power.

For example, the optical lens assembly may satisfy the following condition.

$25 \leq (V_{23}) - (V_{24}) \leq 40$ <Condition> where $V_{23}$ denotes the Abbe number of the third aspheric plastic lens, and $V_{24}$ denotes the Abbe number of the lens of the second lens group closest to the image side.

For example, the first lens group may include at least one positive lens, and the first positive lens of the first lens group from the object side may have a refractive index of about 1.8 or greater.

According to various embodiments, an optical lens assembly may include: a first lens group having positive refractive power, a stop, and a second lens group having positive refractive power that are arranged from an object side to an image side, wherein the first lens group may include a first negative lens having a meniscus shape convex toward the object side, a second negative lens, and a third positive lens being a biconvex lens, wherein a lens of the second lens group closest to the image side may have an object-side surface and an image-side surface, and may have at least one inflection point on at least one of the object-side surface and the image-side surface, and the optical lens assembly may have a field of view of about 130° or greater.

For example, the lens of the second lens group closest to the image side may have a meniscus shape convex toward the object side in a region near an optical axis.

For example, the second lens group may further include a positive lens, a negative lens, and a positive lens that are arranged between the stop and the lens of the second lens group closest to the image side.

According to various embodiments, an electronic apparatus may include at least one optical lens assembly and an image sensor configured to receive image-forming light from the at least one optical lens assembly, wherein the at least one optical lens assembly may include a first lens group having positive refractive power, a stop, and a second lens group having positive refractive power that are arranged from an object side to an image side, wherein the first lens group may include a first lens having negative refractive power and a meniscus shape convex toward the object side, a second lens having negative refractive power, and at least one other lens, wherein the second lens group may include at least three lenses, and a lens of the second lens group closest to the image side may have an object-side surface convex toward the object side in a region near an optical axis and concave toward the object side in a peripheral region of the lens.

For example, the at least one optical lens assembly may include a first optical lens assembly and a second optical lens assembly, and the first and second optical lens assemblies may be arranged in a straight line.

In the present disclosure, each of the above-described elements may be configured with one or more components, and the names of the elements may vary based on the types of electronic apparatuses. According to embodiments, the electronic apparatus may include at least one of the aforementioned elements. Some elements may be omitted or other additional elements may be further included in the electronic apparatus. Furthermore, in some embodiments, some elements of the electronic apparatus may be combined as one entity, which may have the same functions as those of the elements.

The term "module" used in this disclosure may refer to a unit including, for example, one of hardware, software, firmware or any combination thereof. For example, the term "module" may be interchangeable with a term such as unit, logic, logical block, component, or circuit. A module may be formed mechanically or electronically. For example, a module may include at least one of application-specific integrated circuit (ASIC) chip, field-programmable gate arrays (FPGAs), or a programmable-logic device which have been known or are to be developed.

According to an embodiment, at least a portion of an apparatus (e.g., modules or functions thereof) or a method (e.g., operations), for example, may be implemented as instructions stored in a computer-readable storage medium in the form of a programmable module. When the instructions are executed by one or more processors (e.g., the processor 220 illustrated in FIG. 23), the one or more processors may perform functions corresponding to the instructions. The computer-readable storage medium, for example, may be the memory 230.

A computer-readable recording medium may include a hard disk, a floppy disk, a magnetic medium (e.g., a magnetic tape), an optical medium (e.g., a compact disc read only memory (CD-ROM), a digital versatile disc (DVD), magneto-optical media (e.g., a floptical disk), and a hardware device (e.g., ROM, RAM, or a flash memory). Also, a program instruction may include not only machine language code such as those generated by a compiler but also high-level language code executable on a computer using an interpreter, etc. The above-mentioned hardware device may be configured to operate via one or more software modules to perform operations according to embodiments, and vice versa. A module or a programming module according to an embodiment may include at least one of the above-described elements, or a portion of the above-described elements may be omitted, or additional other elements may be further included. Operations performed by a module, a programming module, or other elements according to an embodiment of the present disclosure may be executed sequentially, in parallel, repeatedly, or in a heuristic method. Also, some operations may be executed in different sequences or may be omitted, or other operations may be added. It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An optical lens assembly comprising a first lens group having positive or negative refractive power, a stop, and a second lens group having positive refractive power that are arranged from an object side to an image side,
   wherein the first lens group comprises a first lens having negative refractive power and a meniscus shape convex toward the object side, a second lens having negative refractive power and a meniscus shape convex toward the object side, and at least one other lens,
   wherein the second lens group comprises at least three lenses, a lens of the second lens group closest to the image side has an object-side surface convex toward the object side in a region near an optical axis and concave toward the object side in a peripheral region of the lens, and the lens of the second lens group closest to the image side has an image-side surface concave toward the image side in the region near the optical axis and convex toward the image side in the peripheral region of the lens,
   wherein the optical lens assembly has a wide field of view without zooming, and
   wherein the first lens and the second lens are sequentially arranged without intervening other lenses, and
   wherein the first lens group comprises at least one positive lens, and a first positive lens of the first lens group from the object side has an aspheric object-side surface and satisfies the following condition:
   <Condition>

$$0 < (RA_{1p\_bestfit} - RA_{1p})/RA_{1p} < 1.5$$

where $RA_{1p\_bestfit}$ denotes a best fit radius of curvature of the object-side surface of the first positive lens of the first lens group, and $RA_{1p}$ denotes a radius of curvature of the object-side surface of the first positive lens of the first lens group, and the best fit radius of curvature refers to a radius of a sphere connecting a vertex of a lens center portion and a peripheral boundary portion of a lens.

2. The optical lens assembly of claim 1, wherein all of the lenses of the second lens group are aspheric plastic lenses.

3. The optical lens assembly of claim 1, wherein the optical lens assembly satisfies the following condition:
<Condition>

$$1.5 < f_2/f < 5.5$$

where $f_2$ denotes a focal length of the second lens group, and f denotes a focal length of the optical lens assembly.

4. The optical lens assembly of claim 1, wherein the optical lens assembly has a field of view within a range of about 130° or greater.

5. The optical lens assembly of claim 1, wherein the optical lens assembly satisfies the following condition:
<Condition>

$$25 < (V_{21}) - (V_{22}) < 40$$

where $V_{21}$ denotes an Abbe number of a first lens of the second lens group from the object side, and $V_{22}$ denotes an Abbe number of a second lens of the second lens group from the object side.

6. The optical lens assembly of claim 1, wherein the first lens group comprises at least one positive lens, and the optical lens assembly satisfies the following condition:
<Condition>

$$0.6 < f_2/f_{1p} < 1.6$$

where $f_2$ denotes a focal length of the second lens group, and $f_{1p}$ denotes a focal length of the first positive lens of the first lens group from the object side.

7. The optical lens assembly of claim 1, wherein the first lens group comprises at least one positive lens, and theft first positive lens of the first lens group from the object side has a refractive index of about 1.73 to about 1.85.

8. The optical lens assembly of claim 1, wherein the first lens group comprises at least one positive lens, and the first positive lens of the first lens group from the object side has an Abbe number of about 29 to about 55.

9. The optical lens assembly of claim 1, wherein the first lens group comprises at least one positive lens, and the optical lens assembly satisfies the following condition:
<Condition>

$$2.0 < f_{1p}/f < 4.0$$

where $f_{1p}$ denotes a focal length of a first positive lens of the first lens group from the object side, and f denotes a focal length of the optical lens assembly.

10. An optical lens assembly comprising a first lens group having positive or negative refractive power, a stop, and a second lens group having positive refractive power that are arranged from an object side to an image side,
wherein the first lens group comprises a first lens having negative refractive power and a meniscus shape convex toward the object side, a second lens having negative refractive power and a meniscus shape convex toward the object side, and at least one other lens,
wherein the second lens group comprises at least three lenses, a lens of the second lens group closest to the image side has an object-side surface convex toward the object side in a region near an optical axis and concave toward the object side in a peripheral region of the lens, and the lens of the second lens group closest to the image side has an image-side surface concave toward the image side in the region near the optical axis and convex toward the image side in the peripheral region of the lens,
wherein the optical lens assembly has a wide field of view without zooming, and wherein the first lens and the second lens are sequentially arranged without intervening other lenses, wherein the second lens group further comprises a first aspheric plastic lens having positive refractive power, a second aspheric plastic lens having negative refractive power, and a third aspheric plastic lens having positive refractive power that are sequentially arranged from the object side to the lens of the second lens group closest to the image side, and wherein the lens of the second lens group closest to the image side is an aspheric plastic lens having negative refractive power.

11. The optical lens assembly of claim 10, wherein the optical lens assembly satisfies the following condition:
<Condition>

$$25 < (V_{23}) - (V_{24}) < 40$$

where $V_{23}$ denotes an Abbe number of the third aspheric plastic lens, and $V_{24}$ denotes an Abbe number of the lens of the second lens group closest to the image side.

12. The optical lens assembly of claim 1, wherein the first lens group comprises at least one positive lens, and theft first positive lens of the first lens group from the object side has a refractive index of about 1.8 or greater.

13. An optical lens assembly comprising a first lens group having positive or negative refractive power, a stop, and a second lens group having positive refractive power that are arranged from an object side to an image side,
wherein the first lens group consists of a first negative lens having a meniscus shape convex toward the object side, a second negative lens, and a third positive lens being a biconvex lens,
wherein a lens of the second lens group closest to the image side has an object-side surface and an image-side surface, and has at least one inflection point on at least one of the object-side surface and the image-side surface,
wherein the optical lens assembly has a field of view of about 130° or greater without zooming, and
wherein the third positive lens of the first lens group has an aspheric object-side surface and satisfies the following conditions:

$$1.73 < N_{1p} < 1.85$$

$$29 < V_{1p} < 55$$

$$0 < (RA_{1p\_bestfit} - RA_{1p})/RA_{1p} < 1.5$$

where $N_{1p}$ denotes a refractive index of the third positive lens of the first lens group, $V_{1p}$ denotes an Abbe number of the third positive lens of the first lens group, $RA_{1p\_bestfit}$ denotes a best fit radius of curvature of the aspheric object-side surface of the third positive lens of the first lens group, and $RA_{1p}$ denotes a radius of curvature of the aspheric object-side surface of the third positive lens of the first lens group, and the best fit radius of curvature refers to a radius of a sphere connecting a vertex of a lens center portion and a peripheral boundary portion of a lens.

14. The optical lens assembly of claim 13, wherein the lens of the second lens group closest to the image side has a meniscus shape convex toward the object side in a region near an optical axis.

15. The optical lens assembly of claim 13, wherein the second lens group further comprises a positive lens, a negative lens, and another positive lens that are arranged between the stop and the lens of the second lens group closest to the image side.

16. The optical lens assembly of claim 13, wherein the optical lens assembly satisfies the following condition:
<Condition>

$$2.0 < f_{1p}/f < 4.0$$

where $f_{1p}$ denotes a focal length of the third positive lens of the first lens group, and f denotes a focal length of the optical lens assembly.

17. An electronic apparatus comprising:
at least one optical lens assembly; and
an image sensor configured to receive image-forming light from the at least one optical lens assembly,
wherein the at least one optical lens assembly comprises a first lens group having positive refractive power, a stop, and a second lens group having positive refractive power that are arranged from an object side to an image side,
wherein the first lens group comprises a first lens having negative refractive power and a meniscus shape convex toward the object side, a second lens having negative refractive power and a meniscus shape convex toward the object side, and at least one other lens,
wherein the second lens group comprises at least three lenses, a lens of the second lens group closest to the image side has an object-side surface convex toward the object side in a region near an optical axis and concave toward the object side in a peripheral region of the lens, and the lens of the second lens group closest to the image side has an image-side surface concave toward the image side in the region near the optical axis and convex toward the image side in the peripheral region of the lens,
wherein the optical lens assembly has a wide field of view without zooming,
wherein the first lens and the second lens are sequentially arranged without intervening other lenses, and
wherein the first lens group comprises at least one positive lens, and a first positive lens of the first lens group from the object side has an aspheric object-side surface and satisfies the following condition:
<Condition>

$$< (RA_{1p\_bestfit} - RA_{1p})/RA_{1p} < 1.5$$

where $RA_{1p\_bestfit}$ denotes a best fit radius of curvature of the object-side surface of the first positive lens of the first lens group, and $RA_{1p}$ denotes a radius of curvature of the object-side surface of the first positive lens of the first lens group, and the best fit radius of curvature refers to a radius of a sphere connecting a vertex of a lens center portion and a peripheral boundary portion of a lens.

18. The electronic apparatus of claim 17, wherein all of the lenses of the second lens group are aspheric plastic lenses.

* * * * *